United States Patent
Narita et al.

(10) Patent No.: US 10,943,609 B2
(45) Date of Patent: Mar. 9, 2021

(54) MAGNETIC RECORDING DEVICE AND MAGNETIC HEAD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Naoyuki Narita, Funabashi Chiba (JP); Tomoyuki Maeda, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/541,344

(22) Filed: Aug. 15, 2019

(65) Prior Publication Data

US 2020/0294535 A1    Sep. 17, 2020

(30) Foreign Application Priority Data

Mar. 11, 2019    (JP) .............................. JP2019-043903

(51) Int. Cl.
| | |
|---|---|
| *G11B 5/31* | (2006.01) |
| *G11B 5/11* | (2006.01) |
| *G11B 5/147* | (2006.01) |
| *G11B 5/127* | (2006.01) |
| *G11B 5/35* | (2006.01) |

(Continued)

(52) U.S. Cl.
CPC .............. *G11B 5/11* (2013.01); *G11B 5/1278* (2013.01); *G11B 5/147* (2013.01); *G11B 5/235* (2013.01); *G11B 5/313* (2013.01); *G11B 5/314* (2013.01); *G11B 5/3133* (2013.01); *G11B 5/3146* (2013.01); *G11B 5/35* (2013.01);

(Continued)

(58) Field of Classification Search
None
See application file for complete search history.

(56) References Cited

U.S. PATENT DOCUMENTS

| | | | |
|---|---|---|---|
| 9,076,463 B2 | 7/2015 | Yamada et al. | |
| 9,230,571 B1 * | 1/2016 | Chen ..................... | G11B 5/314 |

(Continued)

FOREIGN PATENT DOCUMENTS

| | | |
|---|---|---|
| JP | 2018-156709 A | 10/2018 |
| JP | 2019-57338 A | 4/2019 |

*Primary Examiner* — William J Klimowicz
(74) *Attorney, Agent, or Firm* — Finnegan, Henderson, Farabow, Garrett & Dunner, L.L.P.

(57) ABSTRACT

According to one embodiment, a magnetic recording device includes a magnetic head, a first circuit, and a second circuit. The magnetic head includes a magnetic pole, a first shield, a stacked body provided between the magnetic pole and the first shield, a first terminal electrically connected to the magnetic pole, a second terminal electrically connected to the first shield, and a coil. The first circuit is electrically connected to the first terminal and the second terminal. The second circuit is electrically connected to the coil. The first circuit performs at least a first operation. In the first operation, the first circuit supplies a first current to a current path between the first and second terminals when the second circuit supplies a recording current to the coil. The first current is smaller than a second current. The second current causes an electrical resistance of the current path to oscillate.

15 Claims, 13 Drawing Sheets

(51) Int. Cl.
 *G11B 5/235* (2006.01)
 *G11B 5/00* (2006.01)
(52) U.S. Cl.
 CPC ............. *G11B 2005/0005* (2013.01); *G11B 2005/0024* (2013.01)

(56) References Cited

U.S. PATENT DOCUMENTS

| | | | |
|---|---|---|---|
| 9,355,654 B1* | 5/2016 | Mallary | G11B 5/1278 |
| 9,640,203 B1* | 5/2017 | Buch | G11B 5/02 |
| 9,672,846 B1* | 6/2017 | Tanaka | G11B 5/17 |
| 9,870,789 B2* | 1/2018 | Funayama | G11B 20/10018 |
| 10,388,305 B1* | 8/2019 | De Albuquerque | G11B 5/012 |
| 10,410,656 B1* | 9/2019 | Guo | G11B 5/012 |
| 10,410,658 B1* | 9/2019 | Liu | G11B 5/09 |
| 10,601,368 B2* | 3/2020 | Lu | H03B 5/00 |
| 10,629,229 B2* | 4/2020 | Contreras | G11B 5/02 |
| 2010/0007992 A1* | 1/2010 | Yamada | G11B 5/3146 360/244 |
| 2012/0126905 A1* | 5/2012 | Zhang | G11C 11/1675 331/94.1 |
| 2013/0120875 A1* | 5/2013 | Suto | H01F 10/329 360/123.01 |
| 2018/0254058 A1* | 9/2018 | Chen | G11B 5/314 |
| 2018/0268848 A1 | 9/2018 | Narita et al. | |
| 2019/0088275 A1 | 3/2019 | Narita et al. | |
| 2019/0244635 A1* | 8/2019 | Goncharov | G11B 5/35 |

* cited by examiner

MAGNETIC RECORDING DEVICE AND MAGNETIC HEAD

CROSS-REFERENCE TO RELATED APPLICATIONS

This application is based upon and claims the benefit of priority from Japanese Patent Application No. 2019-043903, filed on Mar. 11, 2019; the entire contents of which are incorporated herein by reference.

FIELD

Embodiments described herein relate generally to a magnetic recording device and a magnetic head.

BACKGROUND

Information is recorded in a magnetic recording medium such as a HDD (Hard Disk Drive) or the like using a magnetic head. It is desirable to increase the recording density of the magnetic recording device and the magnetic head.

BRIEF DESCRIPTION OF THE DRAWINGS

FIG. 11A and FIG. 11B are schematic cross-sectional views illustrating magnetic heads according to the second embodiment;

DETAILED DESCRIPTION

Figure 1A:
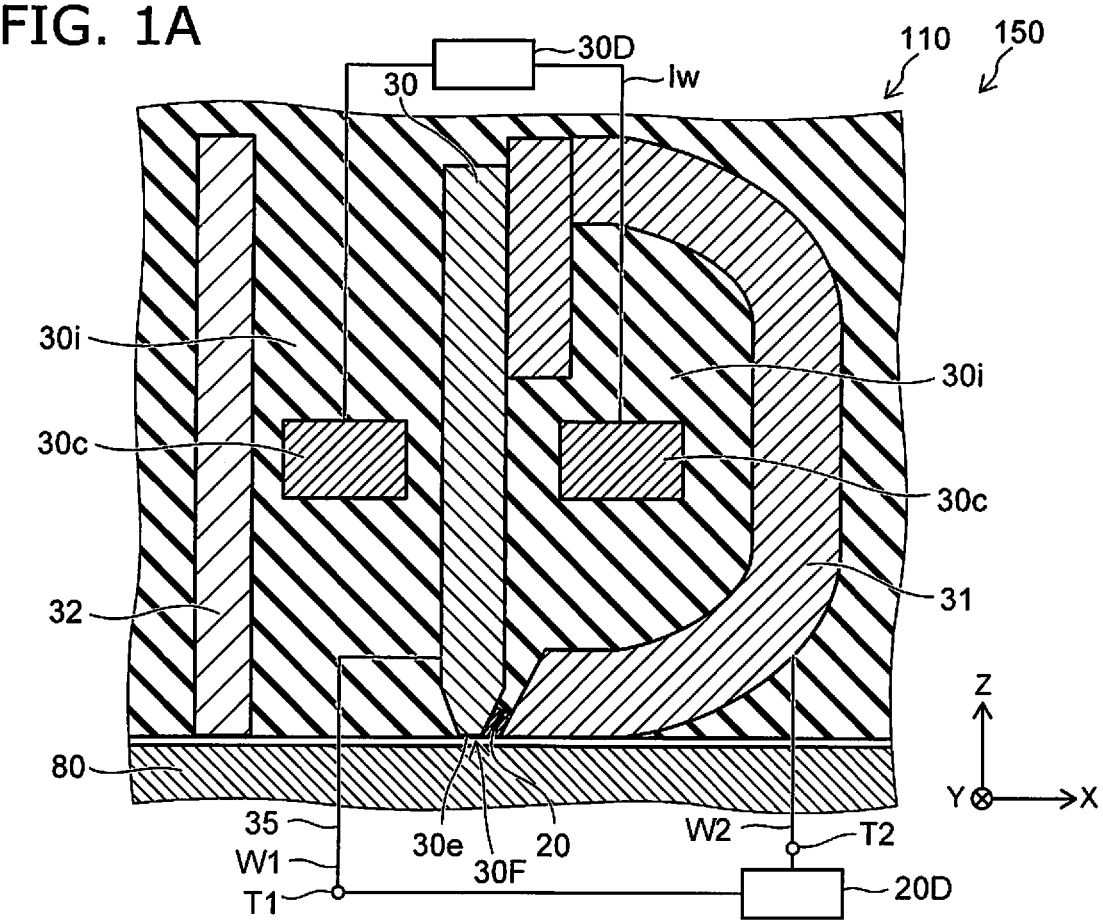
FIG. 1A and FIG. 1B are schematic cross-sectional views illustrating a magnetic head and a magnetic recording device according to a first embodiment.

According to one embodiment, a magnetic recording device includes a magnetic head, a first circuit, and a second circuit. The magnetic head includes a magnetic pole, a first shield, a stacked body provided between the magnetic pole and the first shield, a first terminal electrically connected to the magnetic pole, a second terminal electrically connected to the first shield, and a coil. The first circuit is electrically connected to the first terminal and the second terminal. The second circuit is electrically connected to the coil. The first circuit performs at least a first operation. In the first operation, the first circuit supplies a first current to a current path between the first terminal and the second terminal when the second circuit supplies a recording current to the coil. The first current is smaller than a second current. The second current causes an electrical resistance of the current path to oscillate.

According to another embodiment, a magnetic head includes a magnetic pole, a first shield, a stacked body provided between the magnetic pole and the first shield, a first terminal electrically connected to the magnetic pole, and a second terminal electrically connected to the first shield. The stacked body includes a first magnetic layer, a first conductive layer, a second conductive layer, a second magnetic layer, a third magnetic layer, a third conductive layer, and a fourth conductive layer. The first conductive layer is provided between the first shield and the first magnetic layer. The first conductive layer includes a first element including at least one selected from the group consisting of Cu, Ag, Al, Cr, and Au. The second conductive layer is provided between the magnetic pole and the first magnetic layer. The second conductive layer includes a second element including at least one selected from the group consisting of Ta, Pt, W, Mo, Ir, Ru, Tb, Rh, and Pd. The second magnetic layer is provided between the first magnetic layer and the second conductive layer. The third magnetic layer is provided between the first magnetic layer and the second magnetic layer. The third conductive layer is provided between the first magnetic layer and the third magnetic layer. The third conductive layer includes a third element including at least one selected from the group consisting of Ta, Pt, W, Mo, Ir, Ru, Tb, Rh, and Pd. The fourth conductive layer is provided between the third magnetic layer and the second magnetic layer. The fourth conductive layer includes a fourth element including at least one selected from the group consisting of Cu, Au, Ag, Al, Cr, Ta, Pt, W, Mo, Ir, Ru, Tb, Rh, and Pd.

According to another embodiment, a magnetic head includes a magnetic pole, a first shield, a stacked body provided between the magnetic pole and the first shield, a first terminal electrically connected to the magnetic pole, and a second terminal electrically connected to the first shield. The stacked body includes a first magnetic layer, a first conductive layer, a second conductive layer, a second magnetic layer, a third magnetic layer, a third conductive layer, and a fourth conductive layer. The first conductive layer is provided between the magnetic pole and the first magnetic layer. The first conductive layer includes a first element including at least one selected from the group consisting of Cu, Ag, Al, Cr, and Au. The second conductive layer is provided between the first shield and the first magnetic layer. The second conductive layer includes a second element including at least one selected from the group consisting of Ta, Pt, W, Mo, Ir, Cr, Tb, Rh, and Pd. The second magnetic layer is provided between the first magnetic layer and the second conductive layer. The third magnetic layer is provided between the first magnetic layer and the second magnetic layer. The third conductive layer is provided between the first magnetic layer and the third magnetic layer. The third conductive layer includes a third element including at least one selected from the group consisting of Ta, Pt, W, Mo, Ir, Cr, Tb, Rh, and Pd. The fourth conductive layer is provided between the third magnetic layer and the second magnetic layer. The fourth conductive layer includes a fourth element including at least one selected from the group consisting of Cu, Au, Ag, Al, Cr, Ta, Pt, W, Mo, Ir, Ru, Tb, Rh, and Pd.

According to another embodiment, a magnetic head includes a magnetic pole, a first shield, a stacked body provided between the magnetic pole and the first shield, a first terminal electrically connected to the magnetic pole, and a second terminal electrically connected to the first shield. A first change rate of an electrical resistance of a current path with respect to a fluctuation of a first current when the first current flows in the current path is different from a second change rate of the electrical resistance of the current path with respect to a fluctuation of a second current when the second current flows in the current path. The current path is between the first terminal and the second terminal. The first change rate is different from a third change rate of the electrical resistance of the current path to a fluctuation of a third current when the third current flows in the current path. A magnitude of the first current is in a first current range. A magnitude of the second current is in a second current range larger than the first current range. A magnitude of the third current is in a third current range smaller than the first current range.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
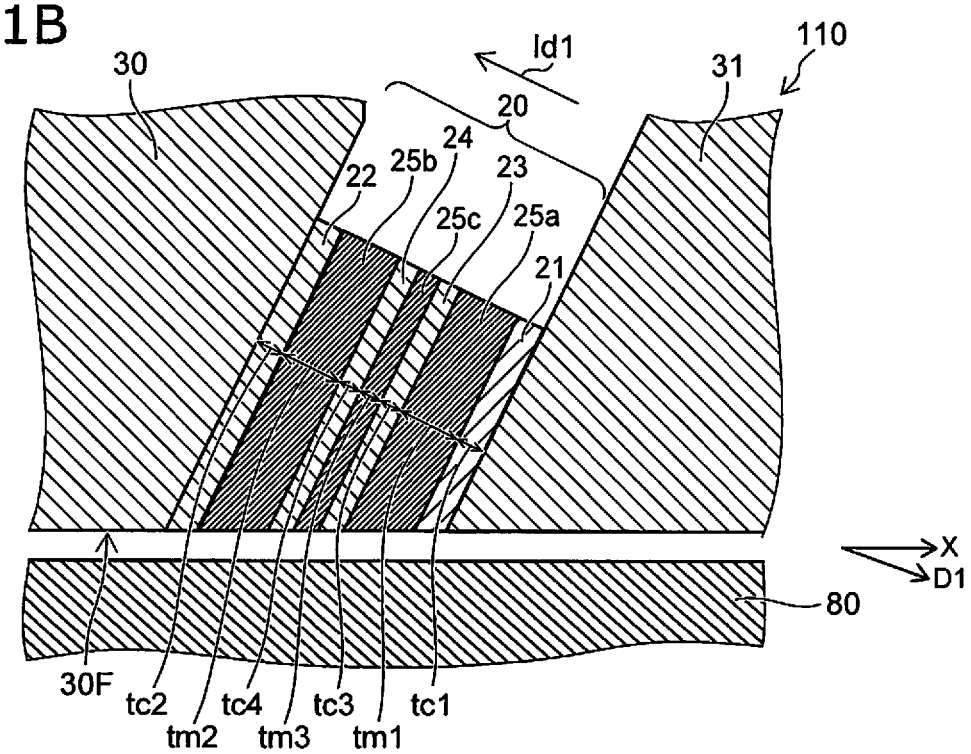

FIG. 1A and FIG. 1B are schematic cross-sectional views illustrating a magnetic head and a magnetic recording device according to a first embodiment.

FIG. 1B is an enlarged view of a portion of FIG. 1A.

As shown in FIG. 1A, the magnetic recording device 150 according to the embodiment includes the magnetic head 110. The magnetic head 110 includes a magnetic pole 30, a first shield 31, and a stacked body 20. In the example, the magnetic head 110 further includes a first terminal T1, a second terminal T2, a second shield 32, and a coil 30c.

At least a portion of the magnetic pole 30 is provided between the first shield 31 and the second shield 32. For example, at least a portion of the coil 30c is provided between the magnetic pole 30 and the first shield 31. In the example, a portion of the coil 30c is provided between the magnetic pole 30 and the second shield 32.

A second circuit 30D (a recording electrical circuit) is electrically connected to the coil 30c. A recording current Iw is supplied to the coil 30c from the recording electrical circuit. A magnetic field (a recording magnetic field) that corresponds to the recording current Iw is generated from the magnetic pole 30. The recording magnetic field is applied to a magnetic recording medium 80; and information is recorded in the magnetic recording medium 80. Thus, the recording electrical circuit (the second circuit 30D) is configured to supply, to the coil 30c, a current (the recording current Iw) corresponding to the information to be recorded.

As shown in FIG. 1A, for example, an insulating portion 30I is provided around the magnetic pole 30, the first shield 31, the second shield 32, the coil 30c, and the stacked body 20. The insulating portion 30i is not illustrated in FIG. 1B.

The magnetic pole 30 is, for example, a major magnetic pole. A magnetic pole surface 30F is provided at an end portion 30e of the magnetic pole 30. For example, the magnetic pole surface 30F is aligned with the ABS (Air Bearing Surface) of the magnetic head 110. The magnetic pole surface 30F opposes the magnetic recording medium 80.

A direction perpendicular to the magnetic pole surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is the cross-track direction.

For example, the magnetic pole 30 is separated from the first shield 31 along the X-axis direction at the vicinity of the magnetic pole surface 30F. For example, the second shield 32 is separated from the magnetic pole 30 along the X-axis direction at the vicinity of the magnetic pole surface 30F. The magnetic head 110 and the magnetic recording medium 80 move relatively substantially along the X-axis direction. Thereby, the information is recorded at any position of the magnetic recording medium 80.

For example, the first shield 31 corresponds to a "trailing shield." For example, the second shield 32 corresponds to a "leading shield." For example, the first shield 31 is an auxiliary magnetic pole. The first shield 31 can form a magnetic core with the magnetic pole 30. For example, an additional shield such as a side shield (not illustrated), etc., may be provided.

As shown in FIG. 1A, the magnetic head 110 may include a first wire W1 and a second wire W2. The first wire W1 is electrically connected to the magnetic pole 30. The second wire W2 is electrically connected to the first shield 31. The first terminal T1 is electrically connected to the magnetic pole 30 via the first wire W1. The second terminal T2 is electrically connected to the first shield 31 via the second wire W2.

The stacked body 20 is electrically connected to the magnetic pole 30 and the first shield 31. A current path 35 is formed in the magnetic head 110. The current path 35 includes, for example, the first terminal T1, the first wire W1, the magnetic pole 30, the stacked body 20, the first shield 31, the second wire W2, and the second terminal T2.

For example, a current Id1 (referring to FIG. 1B) is supplied between the first terminal T1 and the second terminal T2 from a first circuit 20D. The current Id1 is supplied to the current path 35 (FIG. 1A).

In the example as shown in FIG. 1B, the stacked body 20 includes a first magnetic layer 25a, a second magnetic layer 25b, a third magnetic layer 25c, a first conductive layer 21, a second conductive layer 22, a third conductive layer 23, and a fourth conductive layer 24.

The first magnetic layer 25a is provided between the magnetic pole 30 and the first shield 31. The first conductive layer 21 is provided between the first shield 31 and the first magnetic layer 25a. The first conductive layer 21 includes a first element. The first element includes at least one selected from the group consisting of Cu, Ag, Al, Cr, and Au. The first conductive layer 21 is, for example, a Cu layer.

The second conductive layer 22 is provided between the magnetic pole 30 and the first magnetic layer 25a. The second conductive layer 22 includes a second element. The second element includes at least one selected from the group consisting of Ta, Pt, W, Mo, Ir, Ru, Tb, Rh, and Pd. The second conductive layer 22 is, for example, a Ta layer.

The second magnetic layer 25b is provided between the first magnetic layer 25a and the second conductive layer 22. The third magnetic layer 25c is provided between the first magnetic layer 25a and the second magnetic layer 25b.

The third conductive layer 23 is provided between the first magnetic layer 25a and the third magnetic layer 25c. The third conductive layer 23 includes a third element. The third element includes at least one selected from the group consisting of Ta, Pt, W, Mo, Ir, Ru, Tb, Rh, and Pd. The third conductive layer 23 is, for example, a Ta layer.

The fourth conductive layer 24 is provided between the third magnetic layer 25c and the second magnetic layer 25b. The fourth conductive layer 24 includes a fourth element. The fourth element includes at least one selected from the group consisting of Cu, Au, Ag, Al, Cr, Ta, Pt, W, Mo, Ir, Ru, Tb, Rh, and Pd. The fourth conductive layer 24 is, for example, a Ta layer.

For example, the first conductive layer 21 may contact the first shield 31 and the first magnetic layer 25a. The first magnetic layer 25a may contact the first conductive layer 21 and the third conductive layer 23. For example, the third conductive layer 23 may contact the first magnetic layer 25a and the third magnetic layer 25c. The third magnetic layer 25c may contact the third conductive layer 23 and the fourth conductive layer 24. For example, the fourth conductive layer 24 may contact the third magnetic layer 25c, and the second magnetic layer 25b. For example, the second magnetic layer 25b may contact the fourth conductive layer 24, and the second conductive layer 22. For example, the second conductive layer 22 may contact the second magnetic layer 25b and the magnetic pole 30.

As described above, the second circuit 30D supplies the recording current Iw to the coil 30c of such a magnetic head 110. For example, the polarity of the recording current Iw reverses according to the information to be recorded. For example, a positive recording current Iw is supplied to the coil 30c when recording information corresponding to one of "1" or "−1." For example, a negative recording current Iw is supplied to the coil 30c when recording information corresponding to the other of "1" or "−1."

By such a recording current Iw, a recording magnetic field is generated from a region including the end portion 30e of the magnetic pole 30. As described above, the recording magnetic field is applied to the magnetic recording medium 80; and the information is recorded in the magnetic recording medium 80. At this time, a portion of the recording magnetic field is applied also to the stacked body 20. The electrical resistance of the current path 35 including the stacked body 20 changes according to the application of the portion of the recording magnetic field to the stacked body 20 and the current flowing in the stacked body 20. For example, the electrical resistance of the current path 35 changes when a current (e.g., the current Id1 shown in FIG. 1B) flows in the current path 35 between the first terminal T1 and the second terminal T2 in a state in which the positive or negative recording current Iw is supplied to the coil 30c. Examples of the change of the electrical resistance will now be described.

FIG. 2A to FIG. 2D are graphs illustrating characteristics of the magnetic head and the magnetic recording device according to the first embodiment.

Figure 2A:
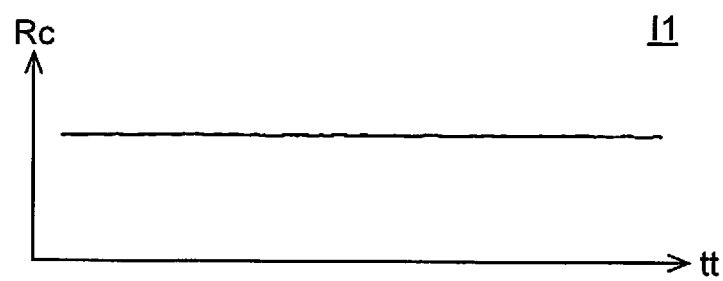
FIG. 2A to FIG. 2D are graphs illustrating characteristics of the magnetic head and the magnetic recording device according to the first embodiment.
Figure 2B:
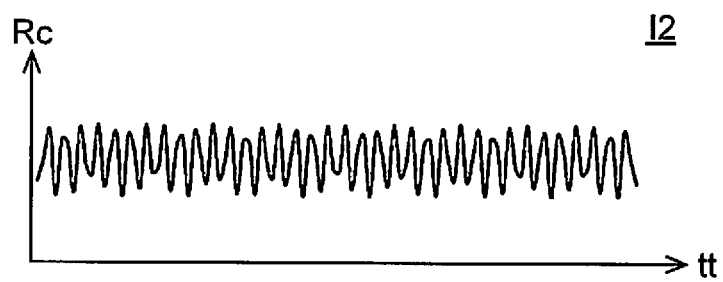

The horizontal axes of FIG. 2A and FIG. 2B correspond to a time tt. The vertical axes correspond to an electrical resistance Rc of the current path 35. FIG. 2A illustrates a characteristic when the current (e.g., the current Id1 shown in FIG. 1B) flowing in the current path 35 is one current (a first current I1). As shown in FIG. 2A, the electrical resistance Rc is substantially constant for the first current I1. The electrical resistance Rc for the first current I1 does not oscillate.

FIG. 2B illustrates a characteristic when the current (e.g., the current Id1) flowing in the current path 35 is another current (a second current I2). The magnitude of the second current I2 is greater than the magnitude of the first current I1; and as shown in FIG. 2B, the electrical resistance Rc for the second current I2 temporally changes periodically. The electrical resistance Rc for the second current I2 oscillates. The frequency of the oscillation of the electrical resistance Rc is, for example, not less than 10 GHz and not more than 50 GHz.

In the embodiment, for example, the first circuit 20D performs at least a first operation. In the first operation, the first circuit 20D supplies the first current I1 recited above to the current path 35 when the second circuit 30D supplies the recording current Iw to the coil 30c. The first current I1 is a current that is smaller than the second current I2 for which the electrical resistance Rc of the current path 35 oscillates. Thereby, as described below, the recording magnetic field is applied effectively to the magnetic recording medium 80. Thereby, a magnetic recording device can be provided in which the recording density can be increased.

In the embodiment, the first circuit 20D may further perform the following second operation. In the second operation, the first circuit 20D supplies the second current I2 recited above to the current path 35 when the second circuit 30D supplies the recording current Iw to the coil 30c. As described below, a high frequency magnetic field that is generated by the oscillation based on the second current I2 can efficiently control the magnetization of the magnetic recording medium 80; and the recording density can be increased. For example, the first operation and the second operation may be performed while being switched. It is even easier to increase the recording density.

Examples of the change of the electrical resistance will now be described further.

Figure 2C:
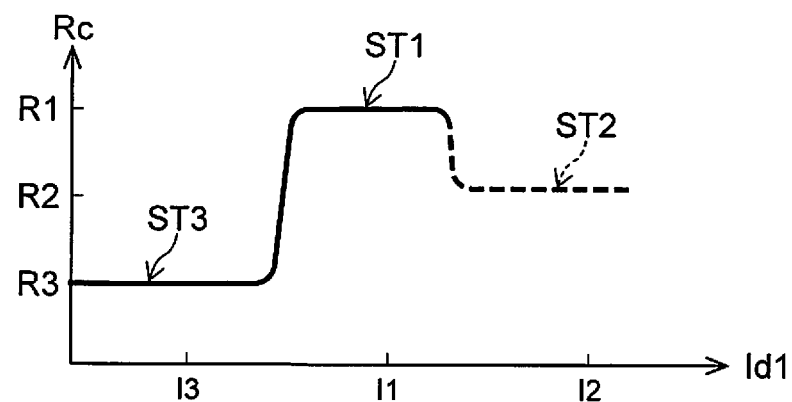

In FIG. 2C, the horizontal axis corresponds to the magnitude of the current Id1. The vertical axis corresponds to the electrical resistance Rc of the current path 35. The characteristic of FIG. 2C is a characteristic when the second circuit 30D supplies the recording current Iw to the coil 30c and a portion of the recording magnetic field based on the recording current Iw is applied to the stacked body 20. The recording current Iw is one of a positive current or a negative current.

As shown in FIG. 2C, the current path 35 has a first electrical resistance R1 when the first current I1 flows in the current path 35 while the second circuit 30D supplies the recording current Iw to the coil 30c.

The current path 35 has a second electrical resistance R2 when the second current I2 flows in the current path 35 while the second circuit 30D supplies the recording current Iw recited above to the coil 30c. The second current I2 is larger than the first current I1. The orientation of the second current I2 is the same as the orientation of the first current I1. The second electrical resistance R2 is lower than the first electrical resistance R1. The second electrical resistance R2 changes temporally because the second electrical resistance R2 oscillates. Accordingly, the temporal average value of the second electrical resistance R2 is shown in FIG. 2C.

The current path 35 has a third electrical resistance R3 when a third current I3 flows in the current path 35 while the second circuit 30D supplies the recording current Iw recited above to the coil 30c. The third current I3 is smaller than the first current I1. The orientation of the third current I3 is the same as the orientation of the first current I1. The third electrical resistance R3 is lower than the second electrical resistance R2.

For example, when the magnitude of the current supplied to the current path 35 is increased, a third state ST3 of the third electrical resistance R3 transitions to a first state ST1 of the first electrical resistance R1. When the magnitude of the current is increased further, the first state ST1 transitions to a second state ST2 of the second electrical resistance R2. The second state ST2 is an oscillating state. The magnetic head 110 according to the embodiment has such a special electrical resistance change.

There are cases where the temperature of the stacked body 20 increases when the magnitude of the current is increased. Generally, the electrical resistance increases when the temperature increases. Therefore, it is easy to observe the change of the electrical resistance Rc of FIG. 2C more distinctly in a state in which the increase of the temperature is low. For example, the increase of the temperature can be relatively suppressed when the current has a short pulse form, etc. For example, even in the case, of a resistance change due to the temperature increase, the change of the electrical resistance based on the change of the electrical resistance Rc recited above can be observed.

The schematic characteristic illustrated in FIG. 2C shows the substantial electrical resistance Rc of the current path 35. The schematic characteristic illustrated in FIG. 2C substantially does not include the resistance change due to the temperature increase.

Figure 2D:
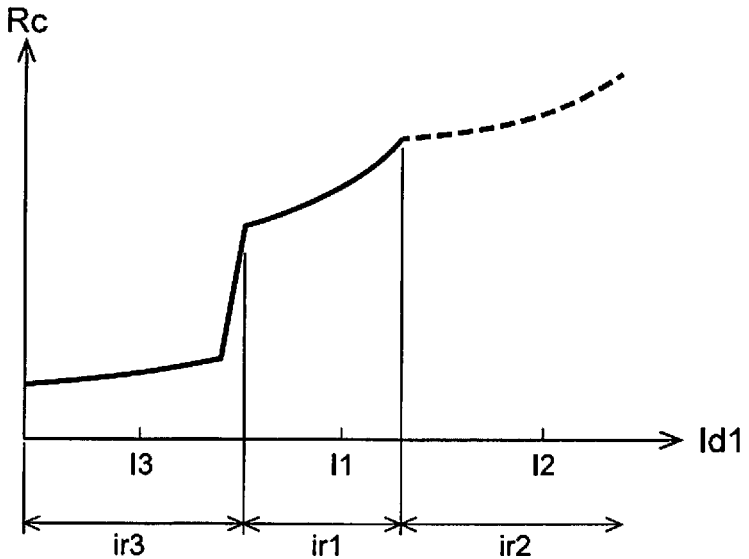

FIG. 2D schematically shows the change of the electrical resistance Rc when the resistance change due to the temperature increase is included. In FIG. 2D, the horizontal axis corresponds to the magnitude of the current Id1. The vertical axis corresponds to the electrical resistance Rc of the current path 35. The temporal average value of the second electrical resistance R2 is shown in FIG. 2D.

As shown in FIG. 2D, for example, the slope of the electrical resistance Rc with respect to the magnitude of the current supplied to the current path 35 changes according to the transition from the third state ST3 to the first state ST1 or the transition from the first state ST1 to the second state ST2. For example, the electrical resistance Rc changes discontinuously with respect to the magnitude of the current supplied to the current path 35 according to the transition from the third state ST3 to the first state ST1 or the transition from the first state ST1 to the second state ST2. This is based on the substantial change of the electrical resistance Rc recited above.

For example, the change rate of the electrical resistance Rc with respect to the change of the first current when the first current I1 flows in the current path 35 while the second circuit 30D supplies the recording current Iw to the coil 30c is taken as a first change rate. The change rate of the electrical resistance Rc with respect to the change of the third current I3 when the third current I3 flows in the current path 35 is taken as a third change rate. The first change rate is, for example, the change rate of the electrical resistance Rc in a first current range ir1. The third change rate is, for example, the change rate of the electrical resistance Rc in a third current range ir3. The third current range ir3 is smaller than the first current range ir1. The magnitude of the third current I3 is smaller than the magnitude of the first current I1. The third change rate is different from the first change rate. For example, the first change rate is higher than the third change rate.

On the other hand, for example, the change rate of the electrical resistance Rc with respect to the change of the second current I2 when the second current I2 flows in the current path 35 while the second circuit 30D supplies the recording current Iw to the coil 30c is taken as a second change rate. The second change rate is, for example, the change rate of the electrical resistance Rc in a second current range ir2. The first change rate that relates to the first current I1 is different from the second change rate.

By using the magnetic head 110 in which such a change of the electrical resistance Rc occurs, the first operation that uses the first current I1 or the second operation that uses the second current I2 is performed.

It is considered that the orientations of the magnetizations of the magnetic layers included in the stacked body 20 change when a current flows in the current path 35 including the stacked body 20 in a state in which a portion of the recording magnetic field is applied to the stacked body 20. It is considered that the change of the electrical resistance Rc illustrated in FIG. 2A to FIG. 2D occurs due to the change of the orientations of the magnetizations. Examples of the first to third states ST1 to ST3 recited above will now be described.

Figure 3A:
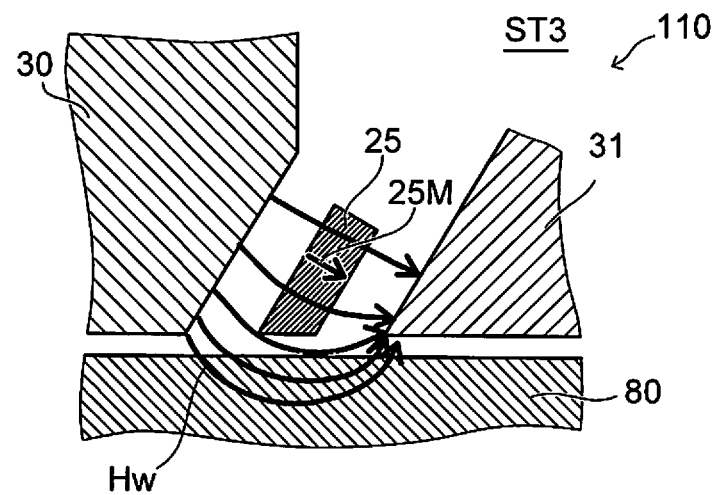
FIG. 3A to FIG. 3C are schematic cross-sectional views illustrating operations of the magnetic head and the magnetic recording device according to the first embodiment.
Figure 3B:
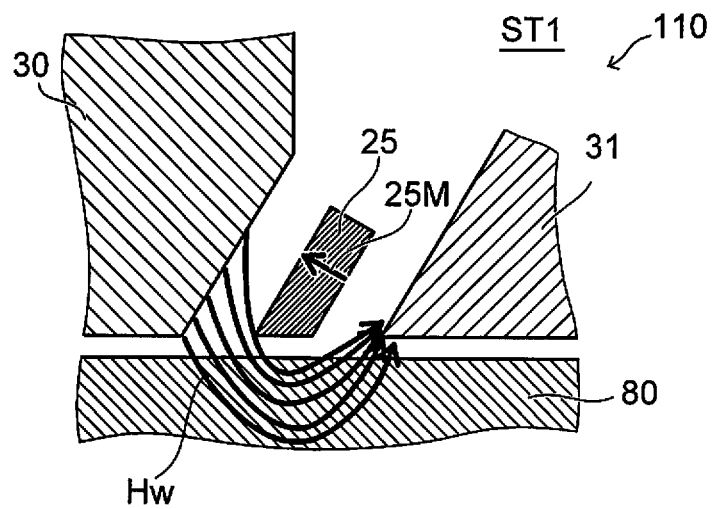
Figure 3C:
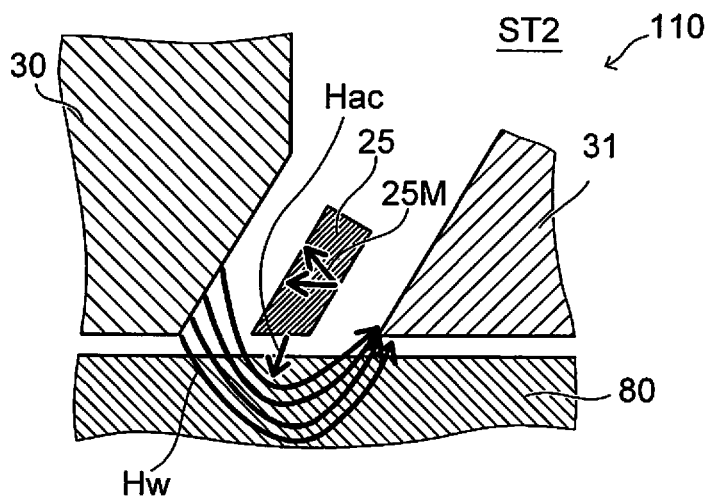

FIG. 3A to FIG. 3C are schematic cross-sectional views illustrating operations of the magnetic head and the magnetic recording device according to the first embodiment.

FIG. 3A corresponds to the third state ST3 recited above. FIG. 3B corresponds to the first state ST1 recited above. FIG. 3C corresponds to the second state ST2 recited above. In these drawings, the multiple magnetic layers that are included in the stacked body 20 are illustrated as one "magnetic layer 25" for easier viewing of the drawing.

In the third state ST3 as shown in FIG. 3A, a recording magnetic field Hw is generated from the magnetic pole 30. A portion (a first portion) of the recording magnetic field Hw is oriented toward the magnetic recording medium 80. In the third state ST3, the third current I3 is supplied to the magnetic layer 25 included in the current path 35. Or, a current is not supplied. Therefore, the orientation of a magnetization 25M of the magnetic layer 25 is the same as the orientation of the recording magnetic field Hw. In such a case, another portion (a second portion) of the recording magnetic field Hw passes through the magnetic layer 25 and enters the first shield 31 without passing through the magnetic recording medium 80. Therefore, in the third state ST3, the amount of the portion (the first portion) of the recording magnetic field Hw generated from the magnetic pole 30 and oriented toward the magnetic recording medium 80 is low.

As shown in FIG. 3B, in the first state ST1 as well, the recording magnetic field Hw is generated from the magnetic pole 30. In the first state ST1, the first current I1 that is not less than a threshold is supplied to the magnetic layer 25 included in the current path 35. The orientation of the magnetization 25M of the magnetic layer 25 is reversed to the reverse of the orientation of the recording magnetic field Hw by the first current I1. In such a case, the recording magnetic field Hw is not easily oriented toward the magnetic layer 25. Therefore, in the first state ST1, the amount of the portion (the first portion) of the recording magnetic field Hw generated from the magnetic pole 30 and oriented toward the magnetic recording medium 80 increases to be greater than the amount in the third state ST3. By utilizing the first state ST1, efficient magnetic recording can be performed.

By performing the recording operation in the first state ST1, even when the write gap is reduced, the orientation of the recording magnetic field Hw emitted from the magnetic pole 30 toward the first shield 31 directly via the magnetic layer 25 is suppressed. As a result, much of the recording magnetic field Hw emitted from the magnetic pole 30 is oriented toward the magnetic recording medium 80. The recording magnetic field Hw is applied effectively to the magnetic recording medium 80. The recording density can be increased thereby.

As shown in FIG. 3C, in the second state ST2 as well, the recording magnetic field Hw is generated from the magnetic pole 30. In the second state ST2, a large second current I2 is supplied to the magnetic layer 25 included in the current path 35. The magnetization 25M of the magnetic layer 25 oscillates due to the second current I2. For example, the magnetization is in an oscillating state for at least one magnetic layer. For example, a high frequency magnetic field Hac is generated from the magnetic layer 25. The high frequency magnetic field Hac is applied to a portion of the magnetic recording medium 80. The frequency of the high frequency magnetic field Hac is designed to substantially match the magnetic resonant frequency of the magnetic recording medium 80. The magnetization reverses easily at the portion of the magnetic recording medium 80 to which the high frequency magnetic field Hac is applied. Thus, magnetic recording that is assisted by the high frequency magnetic field Hac is performed. In such a recording operation as well, the magnetization of the magnetic recording medium 80 can be controlled efficiently; and the recording density can be increased.

In the embodiment, for example, a magnetic recording operation that utilizes the first state ST1 recited above is performed. In the embodiment, a magnetic recording operation that utilizes the second state ST2 recited above may be performed. These operations may be performed while being switched. Such operations can be performed by the first circuit 20D. The first circuit 20D and the second circuit 30D recited above are included in the magnetic recording device 150.

For example, the first circuit 20D performs at least the first operation. In the first operation, the first circuit 20D supplies the first current I1 recited above to the current path 35 when the second circuit 30D supplies the recording current Iw to the coil 30c. Thereby, much of the recording magnetic field Hw emitted from the magnetic pole 30 is oriented toward the magnetic recording medium 80. The recording magnetic field Hw is applied effectively to the magnetic recording medium 80. The recording density can be increased thereby.

According to the embodiment, a magnetic head and a magnetic recording device can be provided in which the recording density can be increased.

In the embodiment, for example, it is favorable for the magnitude of the first current I1 to be not less than ½ of the magnitude of the second current I2. The second state ST2 (oscillation) occurs for a large second current I2. The magnitude of the first current I1 is smaller than the magnitude of the second current I2. Thereby, the first state ST1 recited above is obtained by the first current I1. For example, the third state ST3 recited above occurs when the first current I1 is less than ⅕ of the magnitude of the second current I2. The first state ST1 is obtained easily by the first current I1 when the magnitude of the first current I1 is not less than ⅕ of the magnitude of the second current I2, and more favorably, not less than ½ of the magnitude of the second current I2.

The first current I1 recited above has an orientation from the first shield 31 toward the magnetic pole 30.

The first circuit 20D may further perform the following second operation. In the second operation, the first circuit 20D supplies the second current I2 recited above to the current path 35 when the second circuit 30D supplies the recording current Iw to the coil 30c. Magnetic recording that is assisted by the high frequency magnetic field Hac is performed thereby. The magnetization of the magnetic recording medium 80 can be controlled efficiently; and the recording density can be increased.

The second current I2 recited above has an orientation from the first shield 31 toward the magnetic pole 30. As recited above, the second electrical resistance R2 has the condition for oscillating in the current region of the second operation. The second electrical resistance R2 has the region of the second current I2 changing temporally. The frequency of the oscillation is, for example, not less than 10 GHz and not more than 50 GHz. The temporal average of the electrical resistance changing due to the oscillation corresponds to the second electrical resistance R2 recited above.

The magnetic recording device 150 may include the magnetic recording medium 80. As described above, the information is recorded in the magnetic recording medium 80 by the magnetic head 110. The ratio of the absolute value (|f1−f2|) of the difference between a frequency f1 of the oscillation recited above and a magnetic resonant frequency f2 of the magnetic recording medium 80 to the magnetic resonant frequency f2 is 50% or less. Thus, the frequency f1 of the oscillation is designed to substantially match the magnetic resonant frequency f2. Magnetic recording that is assisted by the high frequency magnetic field Hac is performed thereby. For example, the frequency f1 of the oscillation can be controlled by the current flowing in the stacked body 20 and the magnetic field (a portion of the recording magnetic field Hw) applied to the stacked body 20.

For example, by switching between performing the first operation or the second operation recited above, an appropriate magnetic recording that is matched to the magnetic recording medium 80 that is used can be performed. For example, the second operation recited above may be performed in the case where it is easy to match the frequency f1 of the high frequency magnetic field Hac to the magnetic resonant frequency f2 of the magnetic recording medium 80. For example, the first operation recited above may be performed in the case where it is more advantageous to perform the first operation recited above than to match the frequency f1 of the high frequency magnetic field Hac to the magnetic resonant frequency f2 of the magnetic recording medium 80. More practical magnetic recording can be performed. A more practical magnetic recording device can be provided.

There is a first reference example in which the stacked body 20 functions as a STO (Spin Torque Oscillator). The first state ST1 is not provided in the first reference example.

For example, the third state ST3 directly transitions to the second state ST2 when the current supplied to the stacked body 20 is increased.

There is a second reference example in which the oscillation of a high frequency wave substantially does not occur in the stacked body 20. In the second reference example, the third state ST3 and the first state ST1 are provided; and the second state ST2 does not occur.

In the embodiment, for example, the first to third states ST1 to ST3 such as those recited above are obtained by the stacked body 20 having the configuration including the first to third magnetic layers 25a to 25c recited above and the first to fourth conductive layers 21 to 24 recited above.

For example, the first to third states ST1 to ST3 are behaviors of the magnetization originating in spin transfer torque generated in the magnetic layers by the current flowing in the stacked body 20. The orientation of the magnetization of each magnetic layer included in the stacked body 20 can be changed by the action on each magnetic layer by the spin transfer torque via the conductive layers.

Also, in the embodiment, it was found that the magnetizations of the magnetic layers can be reversed with a high efficiency compared to the second reference example recited above.

Figure 4:
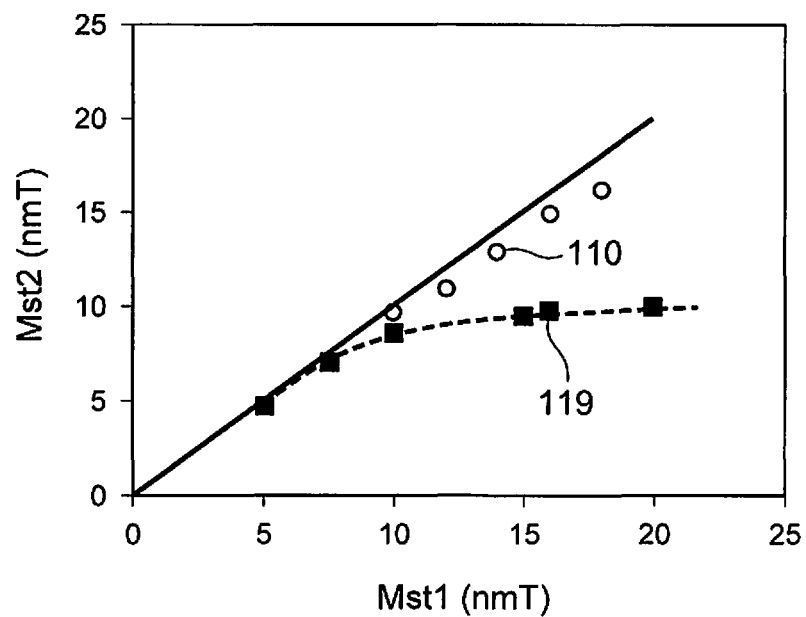
FIG. 4 is a graph illustrating characteristics of magnetic heads and magnetic recording devices.

FIG. 4 is a graph illustrating characteristics of magnetic heads and magnetic recording devices.

FIG. 4 illustrates a characteristic of the magnetic head 110 according to the embodiment when the first operation recited above is performed, and a characteristic of a magnetic head 119 of the second reference example. The magnetic head 110 includes the first to third magnetic layers 25a to 25c recited above and the first to fourth conductive layers 21 to 24 recited above. In the magnetic head 119, the first magnetic layer 25a, the first conductive layer 21, and the second conductive layer 22 are provided; but the second magnetic layer 25b, the third magnetic layer 25c, the third conductive layer 23, and the fourth conductive layer 24 are not provided. In the magnetic head 119, the first conductive layer 21 contacts the first shield 31 and the first magnetic layer 25a; and the second conductive layer 22 contacts the magnetic pole 30 and the first magnetic layer 25a.

FIG. 4 shows simulation results of the relationship between the design value (a designed magnetic volume Mst1) of the magnetic volume of the magnetic layers included in the stacked body 20 and the magnetic volume (a reversal magnetic volume Mst2) of the portion of the magnetic layers included in the stacked body 20 of which the magnetization reverses. In the magnetic head 110, the designed magnetic volume Mst1 corresponds to the sum of the magnetic volumes of the first to third magnetic layers 25a to 25c. In the magnetic head 119, the designed magnetic volume Mst1 corresponds to the magnetic volume of the first magnetic layer 25a. The magnetic volume corresponds to the product of the saturation magnetization of the magnetic layer and the thickness of the magnetic layer. In FIG. 4, the horizontal axis is the designed magnetic volume Mst1. The vertical axis is the reversal magnetic volume Mst2.

In FIG. 4, the reversal magnetic volume Mst2 is expected to be proportional to the designed magnetic volume Mst1. However, in the magnetic head 119 as shown in FIG. 4, the reversal magnetic volume Mst2 saturates when the designed magnetic volume Mst1 becomes large. In the magnetic head 110, the reversal magnetic volume Mst2 increases proportionally to the designed magnetic volume Mst1 even when the designed magnetic volume Mst1 is large. It is considered that this is due to the efficiency of the magnetization reversal increasing because the magnetic layer in which magnetization reversal occurs is subdivided in the magnetic head 110.

Thus, in the magnetic head 110 according to the embodiment, the magnetization can be reversed for substantially the entirety of the magnetic layers even when the designed magnetic volume Mst1 is large. Thereby, much of the recording magnetic field Hw can be oriented toward the magnetic recording medium 80 more effectively.

Figure 5:
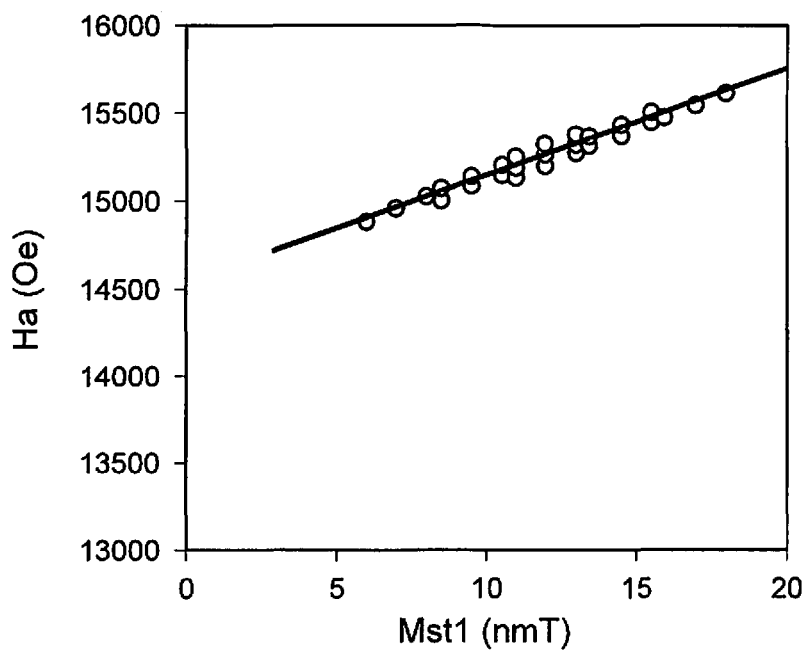
FIG. 5 is a graph illustrating a characteristic of the magnetic head and the magnetic recording device according to the first embodiment.

FIG. 5 is a graph illustrating a characteristic of the magnetic head and the magnetic recording device according to the first embodiment.

FIG. 5 illustrates simulation results of the characteristic when the first operation recited above is performed using the magnetic head 110. In FIG. 5, the horizontal axis is the designed magnetic volume Mst1. The vertical axis is a magnitude Ha of the recording magnetic field Hw applied to the magnetic recording medium 80.

As shown in FIG. 5, the magnitude Ha of the recording magnetic field Hw applied to the magnetic recording medium 80 increases as the designed magnetic volume Mst1 increases. The magnitude Ha increases substantially linearly with respect to the increase of the designed magnetic volume Mst1. According to the magnetic head 110 according to the embodiment, the magnitude Ha of the recording magnetic field Hw applied to the magnetic recording medium 80 can be large as desired. The recording magnetic field Hw is applied to the magnetic recording medium 80 effectively. The recording density can be increased thereby.

As shown in FIG. 1B, the stacking direction of the stacked body 20 (a first direction D1) in the embodiment may be tilted with respect to the Z-axis direction (and the X-axis direction). For example, the stacking direction corresponds to the direction from the second conductive layer 22 toward the first conductive layer 21.

In the embodiment, it is favorable for a thickness tm1 of the first magnetic layer 25a (referring to FIG. 1B) to be, for example, not less than 2 nm and not more than 15 nm. By setting the thickness tm1 of the first magnetic layer 25a in this range, for example, an efficient transition to the second state ST2 occurs. For example, an efficient transition to the third state ST3 occurs. For example, the magnetic recording capacity improves.

It is favorable for a thickness tm2 of the second magnetic layer 25b (referring to FIG. 1B) to be, for example, not less than 2 nm and not more than 15 nm. By setting the thickness tm2 of the second magnetic layer 25b in this range, for example, an efficient transition to the second state ST2 occurs. For example, an efficient transition to the third state ST3 occurs. For example, the magnetic recording capacity improves.

It is favorable for a thickness tm3 of the third magnetic layer 25c (referring to FIG. 1B) to be, for example, not less than 2 nm and not more than 15 nm. By setting the thickness tm3 of the third magnetic layer 25c in this range, for example, an efficient transition to the second state ST2 occurs. For example, an efficient transition to the third state ST3 occurs. For example, the magnetic recording capacity improves.

It is favorable for a thickness tc1 of the first conductive layer 21 (referring to FIG. 1B) to be, for example, not less than 1 nm and not more than 10 nm. By setting the thickness tc1 of the first conductive layer 21 in this range, for example, the spin transfer torque can be applied effectively to the first magnetic layer 25a. For example, it is favorable for the first conductive layer 21 to include a material having a long spin diffusion length.

It is favorable for a thickness tc2 of the second conductive layer 22 (referring to FIG. 1B) to be, for example, not less than 1 nm and not more than 10 nm. By setting the thickness tc2 of the second conductive layer 22 in this range, for example, the spin transfer torque that acts on the second magnetic layer 25b can be controlled effectively. For example, it is favorable for the second conductive layer 22 to include a material having a short spin diffusion length. For example, the spin diffusion length of the material included in the second conductive layer 22 is shorter than the spin diffusion length of the material included in the first conductive layer 21.

It is favorable for a thickness tc3 of the third conductive layer 23 (referring to FIG. 1B) to be, for example, not less than 1 nm and not more than 10 nm. By setting the thickness tc3 of the third conductive layer 23 in this range, for example, the spin transfer torque that acts on the first magnetic layer 25a and the third magnetic layer 25c can be controlled effectively. For example, it is favorable for the third conductive layer 23 to include a material having a short spin diffusion length. For example, the spin diffusion length of the material included in the third conductive layer 23 is shorter than the spin diffusion length of the material included in the first conductive layer 21.

It is favorable for a thickness tc4 of the fourth conductive layer 24 (referring to FIG. 1B) to be, for example, not less than 1 nm and not more than 10 nm. By setting the thickness tc4 of the fourth conductive layer 24 in this range, for example, the spin transfer torque that acts on the second magnetic layer 25b and the third magnetic layer 25c can be controlled effectively.

The thicknesses recited above correspond to lengths along the first direction D1.

In the embodiment, it is favorable for the thickness tm3 of the third magnetic layer 25c along the first direction D1 from the second conductive layer 22 toward the first conductive layer 21 to be thinner than the thickness tm1 of the first magnetic layer 25a along the first direction D1. It is favorable for the thickness tm3 to be thinner than the thickness tm2 of the second magnetic layer 25b along the first direction D1. Thereby, for example, the improvement effect of the recording capacity can be increased.

Several examples of magnetic heads according to the embodiment will now be described. Portions that are different from the magnetic head 110 will be described.

Figure 6:
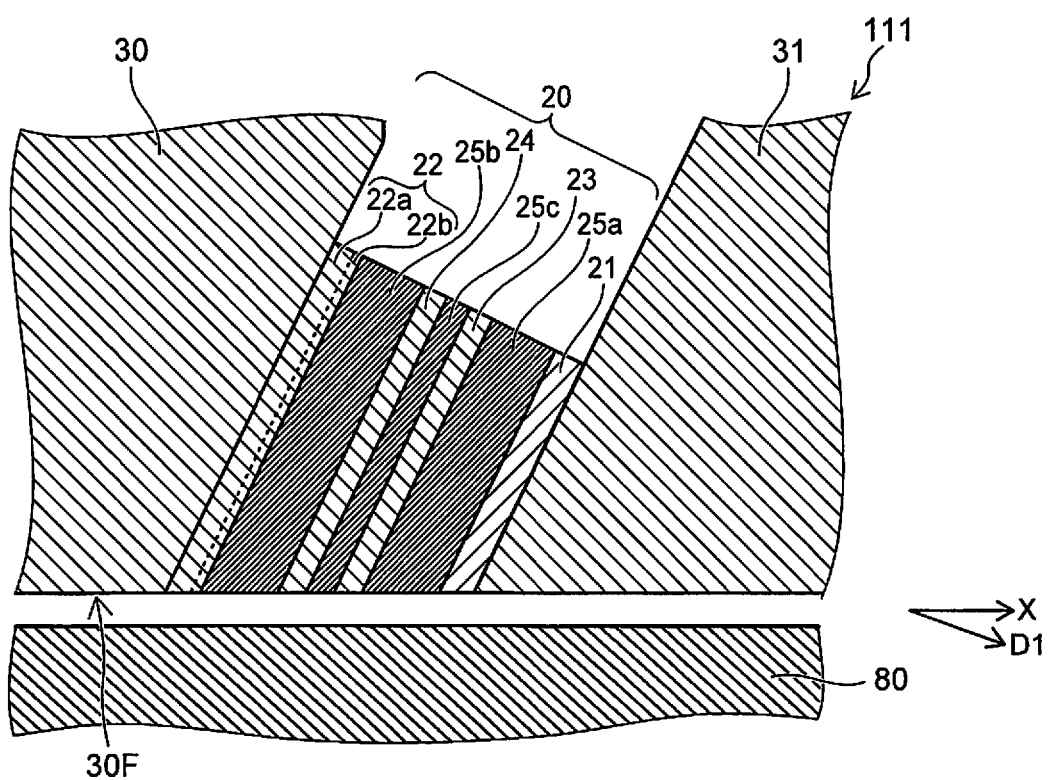
FIG. 6 is a schematic cross-sectional view illustrating a magnetic head according to the first embodiment.

FIG. 6 is a schematic cross-sectional view illustrating a magnetic head according to the first embodiment.

In the magnetic head 111 as shown in FIG. 6, the second conductive layer 22 includes a first region 22a and a second region 22b. The second region 22b is between the first region 22a and the second magnetic layer 25b. The first region 22a includes the second element recited above. The first region 22a includes, for example, Ta. The second region 22b includes at least one selected from the group consisting of Cu, Ag, Au, Al, Ti, Cr, Mg, and V.

For example, there are cases where the damping constant of the second magnetic layer 25b increases if the second element contacts the second magnetic layer 25b. Thereby, it may be difficult for the magnetization of the second magnetic layer 25b to reverse. By providing the second region 22b between the second magnetic layer 25b and the first region 22a including the second element, the increase of the damping constant can be suppressed. Thereby, for example, the first operation recited above can be performed more efficiently.

Figure 7A:
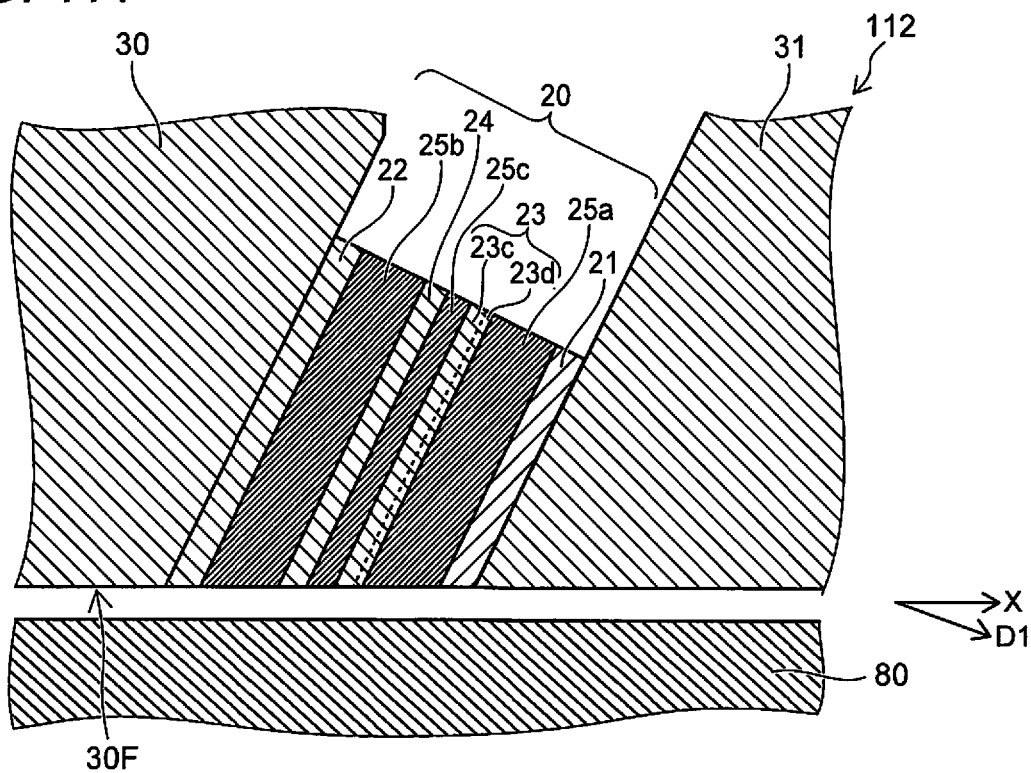
FIG. 7A and FIG. 7B are schematic cross-sectional views illustrating magnetic heads according to the first embodiment
Figure 7B:
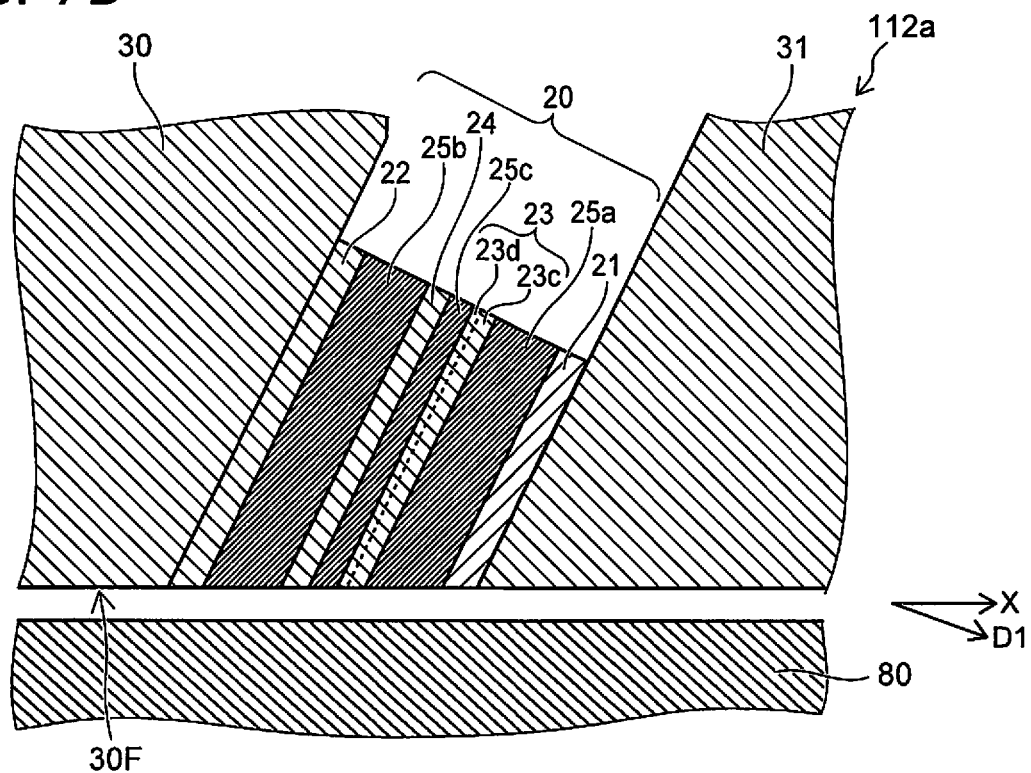

FIG. 7A and FIG. 7B are schematic cross-sectional views illustrating magnetic heads according to the first embodiment.

In the magnetic heads 112 and 112a as shown in FIG. 7A and FIG. 7B, the third conductive layer 23 includes a third region 23c and a fourth region 23d. The fourth region 23d is provided between the third region 23c and the first magnetic layer 25a (referring to FIG. 7A). Or, the fourth region 23d is provided between the third region 23c and the third magnetic layer 25c (referring to FIG. 7B). The third region 23c includes the third element recited above. For example, the third region 23c includes, for example, Ta. The fourth region 23d includes at least one selected from the group consisting of Cu, Ag, Au, Al, Ti, Cr, Mg, and V. The fourth region 23d includes, for example, Cu.

In the magnetic heads 112 and 112a as well, the increase of the damping constant can be suppressed. Thereby, for example, the first operation recited above can be performed more efficiently.

Figure 8A:
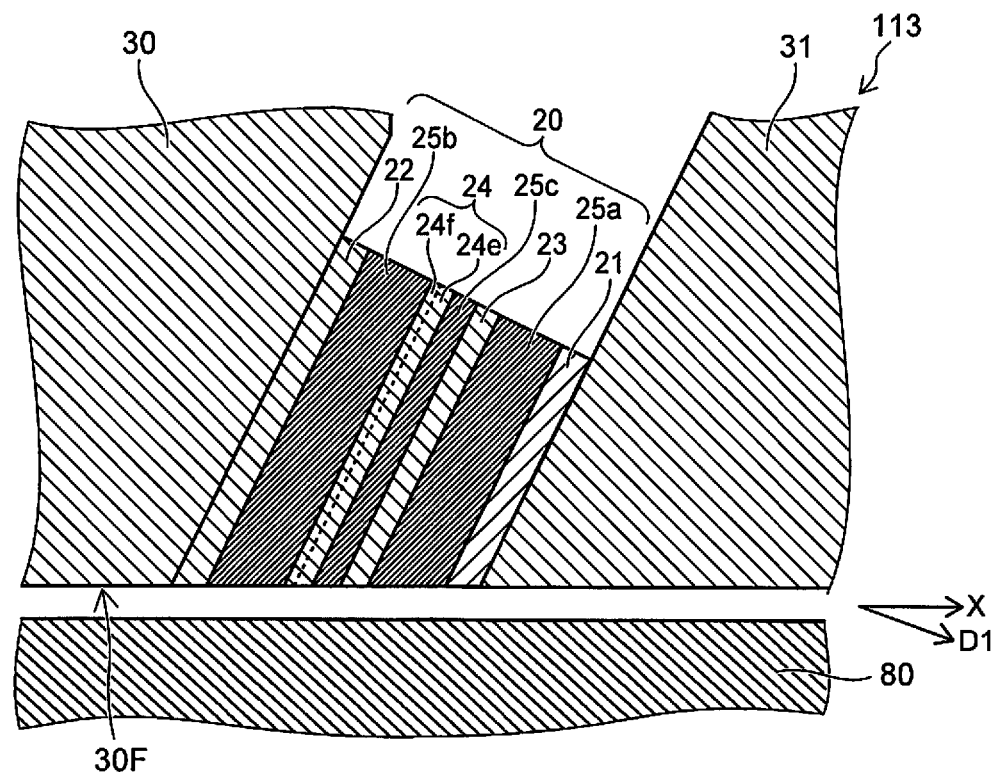
FIG. 8A and FIG. 8B are schematic cross-sectional views illustrating magnetic heads according to the first embodiment.
Figure 8B:
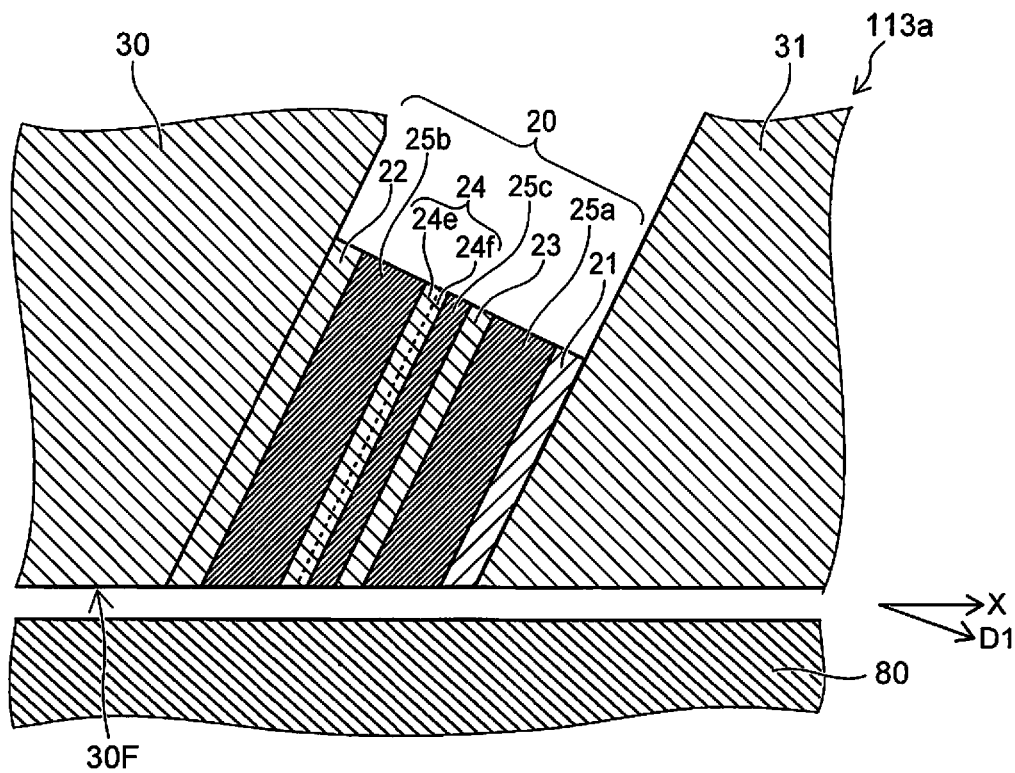

FIG. 8A and FIG. 8B are schematic cross-sectional views illustrating magnetic heads according to the first embodiment.

In the magnetic heads 113 and 113a as shown in FIG. 8A and FIG. 8B, the fourth conductive layer 24 includes a fifth region 24e and a sixth region 24f. The sixth region 24f is provided between the fifth region 24e and the second magnetic layer 25b (referring to FIG. 8A). Or, the sixth region 24f is provided between the fifth region 24e and the third magnetic layer 25c (referring to FIG. 8B). The fifth region 24e may include the fourth element recited above. The fifth region 24e includes, for example, at least one selected from the group consisting of Ta, Pt, W, Mo, Ir, Ru, Tb, Rh, and Pd. For example, the fifth region 24e includes, for example, Ta. The sixth region 24f includes at least one selected from the group consisting of Cu, Ag, Au, Al, Ti, Cr, Mg, and V. For example, the sixth region 24f includes Cu.

In the magnetic heads 113 and 113a as well, the increase of the damping constant can be suppressed. Thereby, for example, the first operation recited above can be performed more efficiently.

The thicknesses of the first region 22a, the third region 23c, and the fifth region 24e each are, for example, not less than 1 nm and not more than 5 nm. The thicknesses of the second region 22b, the fourth region 23d, and the sixth region 24f each are, for example, not less than 1 nm and not more than 5 nm.

Second Embodiment

Portions similar to those of the first embodiment are omitted from a description relating to a second embodiment.

Figure 9:
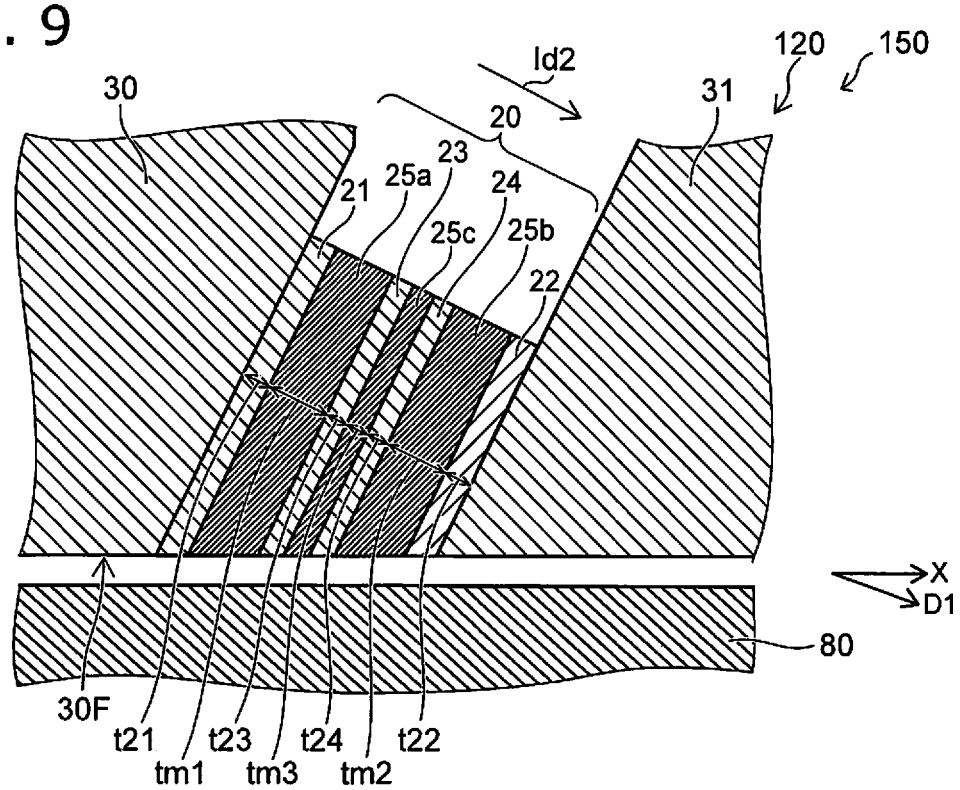
FIG. 9 is a schematic cross-sectional view illustrating a magnetic head and a magnetic recording device according to the second embodiment.

FIG. 9 is a schematic cross-sectional view illustrating a magnetic head and a magnetic recording device according to the second embodiment.

As shown in FIG. 9, the magnetic head 120 according to the second embodiment also includes the magnetic pole 30, the first shield 31, and the stacked body 20. The magnetic head 120 may further include the coil 30c (referring to FIG. 1A), the first terminal T1 (referring to FIG. 1A), and the second terminal T2 (referring to FIG. 1A). The magnetic recording device 150 includes, the magnetic head 120. The magnetic recording device 150 may further include the magnetic recording medium 80, the first circuit 20D (referring to FIG. 1A) and the second circuit 30D (referring to FIG. 1A).

As shown in FIG. 9, in the magnetic head 120 as well, the stacked body 20 includes the first to third magnetic layers 25a to 25c and the first to fourth conductive layers 21 to 24. The order of these layers in the magnetic head 120 is different from the order in the magnetic head 110.

The first conductive layer 21 is provided between the magnetic pole 30 and the first magnetic layer 25a. The first conductive layer 21 includes the first element including at least one selected from the group consisting of Cu, Ag, Al, Cr, and Au.

The second conductive layer 22 is provided between the first shield 31 and the first magnetic layer 25a. The second conductive layer 22 includes the second element including at least one selected from the group consisting of Ta, Pt, W, Mo, Ir, Ru, Tb, Rh, and Pd.

The second magnetic layer 25b is provided between the first magnetic layer 25a and the second conductive layer 22. The third magnetic layer 25c is provided between the first magnetic layer 25a and the second magnetic layer 25b.

The third conductive layer 23 is provided between the first magnetic layer 25a and the third magnetic layer 25c. The third conductive layer 23 includes the third element including at least one selected from the group consisting of Ta, Pt, W, Mo, Ir, Ru, Tb, Rh, and Pd.

The fourth conductive layer 24 is provided between the third magnetic layer 25c and the second magnetic layer 25b. The fourth conductive layer 24 includes the fourth element including at least one selected from the group consisting of Cu, Au, Ag, Al, Cr, Ta, Pt, W, Mo, Ir, Ru, Tb, Rh, and Pd.

In the magnetic head 120 as well, the characteristics of the electrical resistance Rc described in reference to FIGS. 2A to 2D are obtained. In the magnetic head 120, a current Id2 shown in FIG. 9 flows in the current path 35 (FIG. 1A). The current Id2 has an orientation from the magnetic pole 30 toward the first shield 31.

In the magnetic head 120 as well, the first operation recited above is performed. Much of the recording magnetic field Hw emitted from the magnetic pole 30 is oriented toward the magnetic recording medium 80; and the recording magnetic field Hw is applied to the magnetic recording medium 80 effectively. The recording density can be increased thereby. The first current I1 that is supplied to the first operation (referring to FIGS. 2A to 2D) has an orientation from the magnetic pole 30 toward the first shield 31.

In the magnetic head 120, the second operation recited above also may be performed. Magnetic recording that is assisted by the high frequency magnetic field Hac is performed. In such a recording operation as well, the magnetization of the magnetic recording medium 80 can be controlled efficiently; and the recording density can be increased. The second current I2 that is supplied to the second operation (referring to FIGS. 2A to 2D) has an orientation from the magnetic pole 30 toward the first shield 31.

In the magnetic head 120, the operation may be switched between the first operation or the second operation.

A more practical magnetic recording device can be provided.

Figure 10:
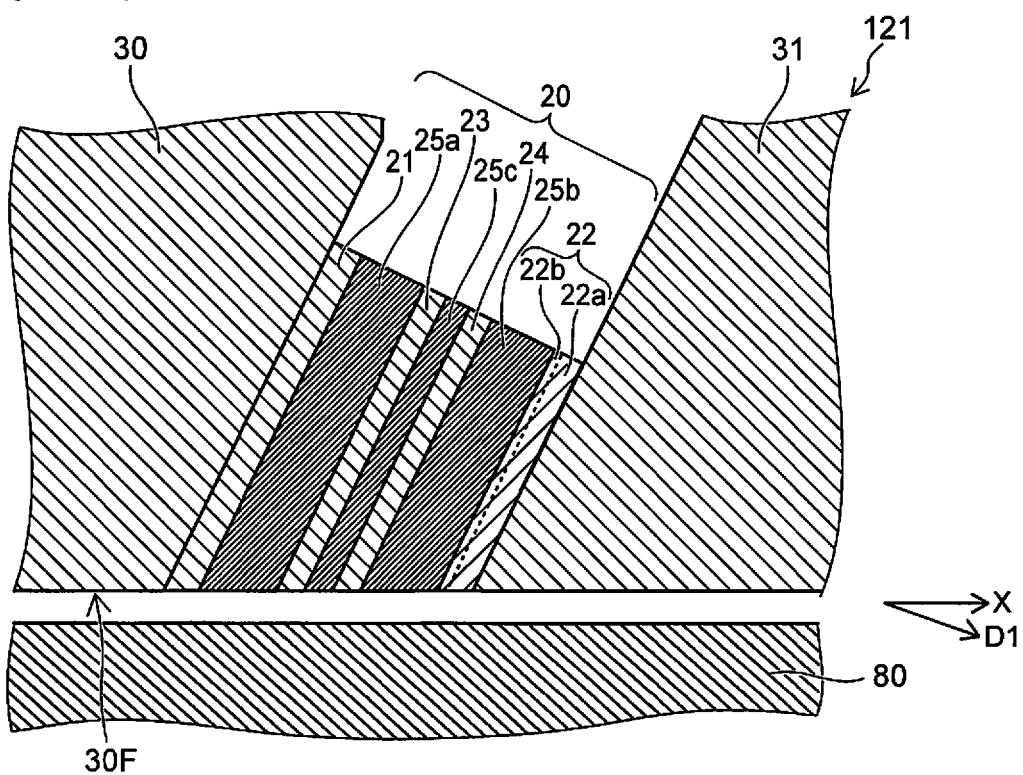
FIG. 10 is a schematic cross-sectional view illustrating a magnetic head according to the second embodiment.

FIG. 10 is a schematic cross-sectional view illustrating a magnetic head according to the second embodiment.

In the magnetic head 121 as shown in FIG. 10, the second conductive layer 22 includes the first region 22a and the second region 22b. The second region 22b is between the first region 22a and the second magnetic layer 25b. The first region 22a includes the second element recited above. The first region 22a includes, for example, Ta. The second region 22b includes at least one selected from the group consisting of Cu, Ag, Au, Al, Ti, Cr, Mg, and V.

Figure 11A:
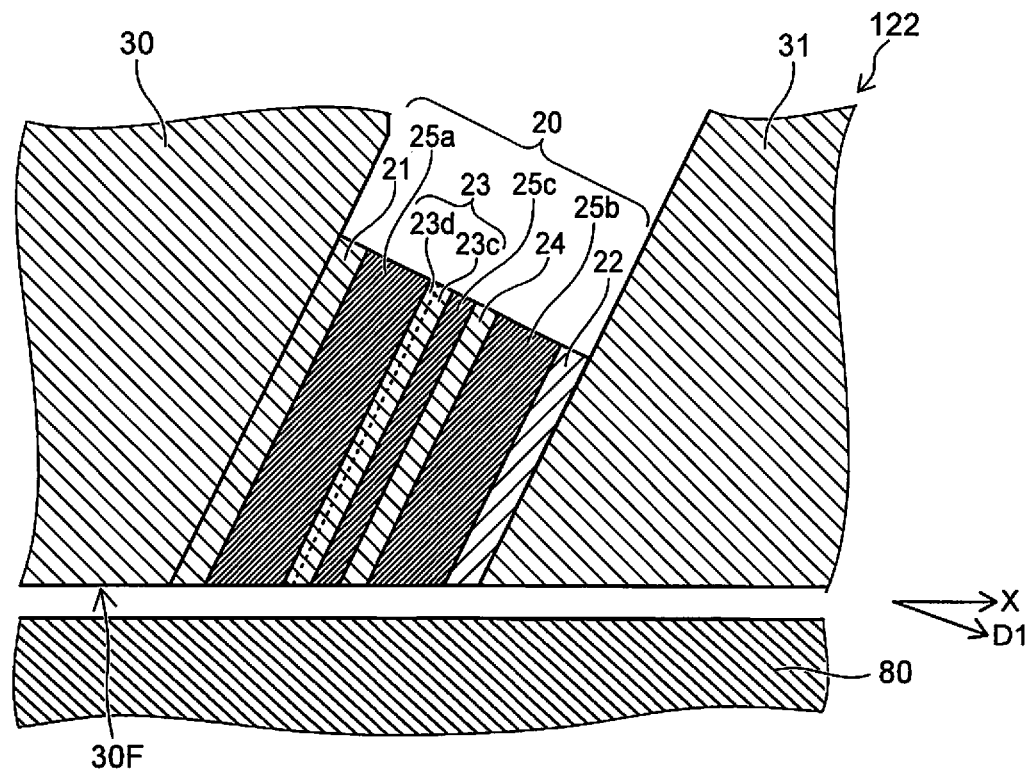
Figure 11A:
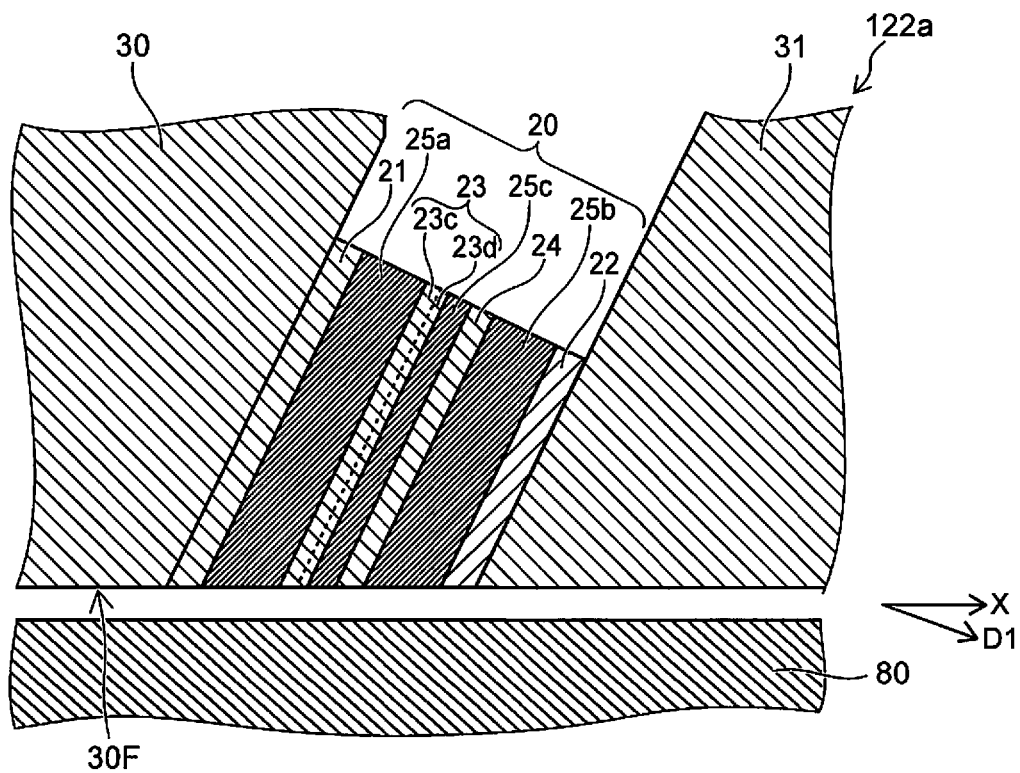

FIG. 11A and FIG. 11B are schematic cross-sectional views illustrating magnetic heads according to the second embodiment.

In the magnetic heads 122 and 122a as shown in FIG. 11A and FIG. 11B, the third conductive layer 23 includes the third region 23c and the fourth region 23d. The fourth region 23d is provided between the third region 23c and the first magnetic layer 25a (referring to FIG. 11A). Or, the fourth region 23d is provided between the third region 23c and the third magnetic layer 25c (referring to FIG. 11B). The third region 23c includes the third element recited above. For example, the third region 23c includes, for example, Ta. The fourth region 23d includes at least one selected from the group consisting of Cu, Ag, Au, Al, Ti, Cr, Mg, and V. The fourth region 23d includes, for example, Cu.

Figure 12A:
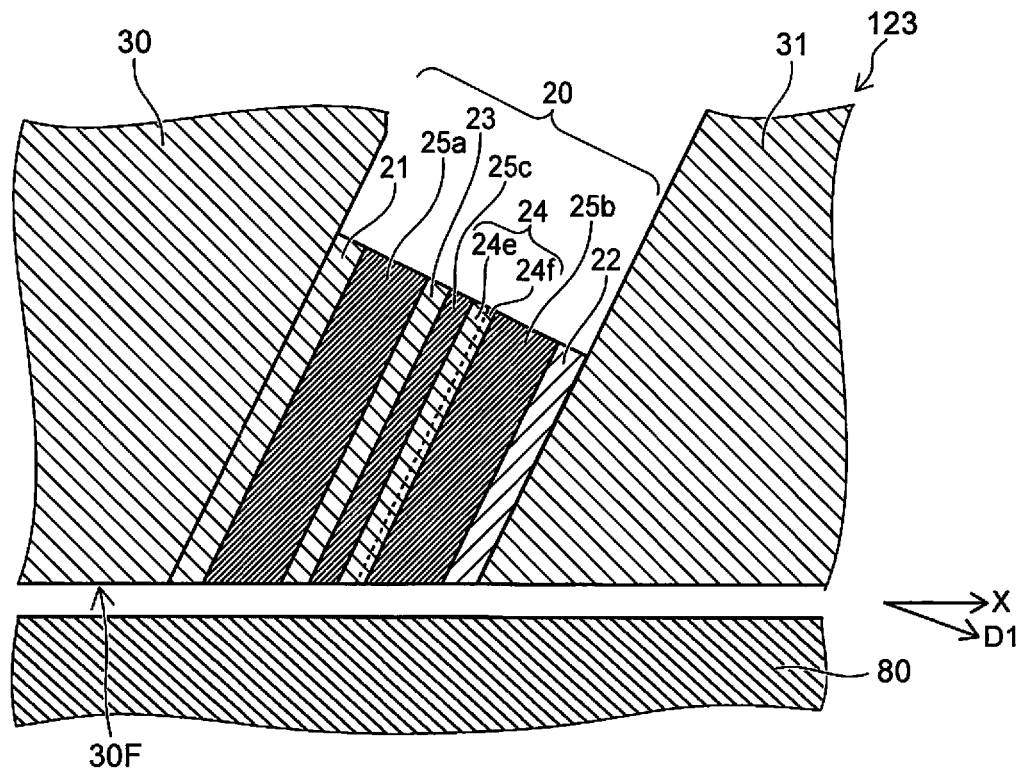
FIG. 12A and FIG. 12B are schematic cross-sectional views illustrating magnetic heads according to the second embodiment.
Figure 12B:
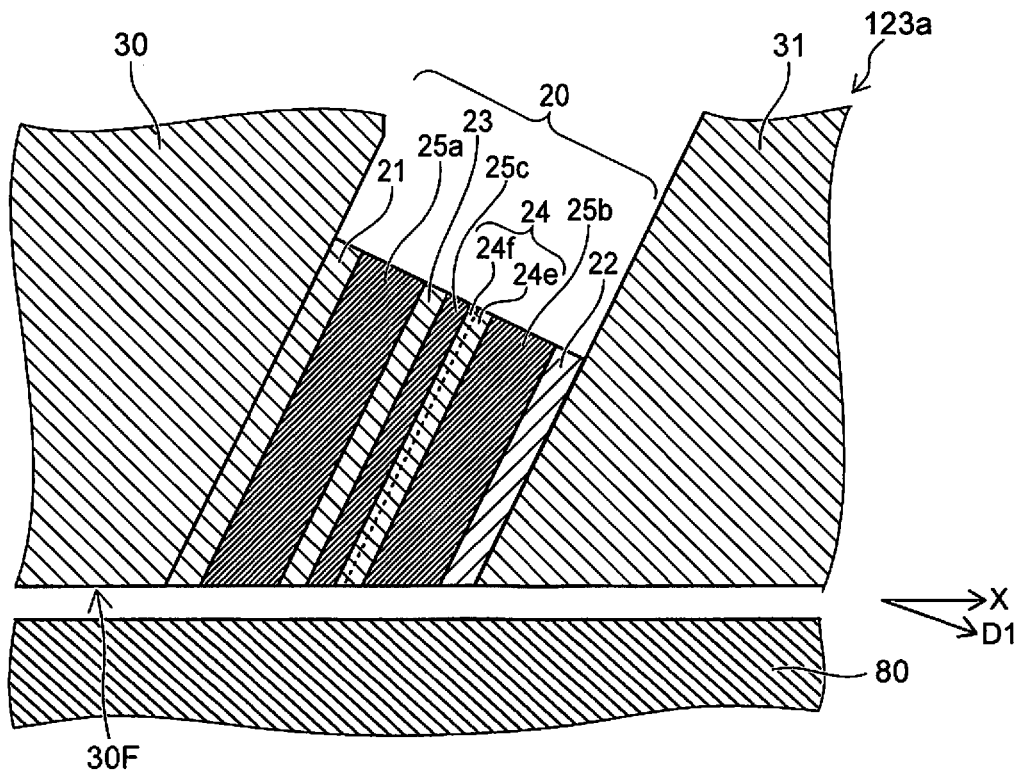

FIG. 12A and FIG. 12B are schematic cross-sectional views illustrating magnetic heads according to the second embodiment.

In the magnetic heads 123 and 123a as shown in FIG. 12A and FIG. 12B, the fourth conductive layer 24 includes the fifth region 24e and the sixth region 24f. The sixth region 24f is provided between the fifth region 24e and the second magnetic layer 25b (referring to FIG. 12A). Or, the sixth region 24f is provided between the fifth region 24e and the third magnetic layer 25c (referring to FIG. 12B). The fifth region 24e includes the fourth element recited above. For example, the fifth region 24e includes, for example, Ta. The sixth region 24f includes at least one selected from the group consisting of Cu, Ag, Au, Al, Ti, Cr, Mg, and V. For example, the sixth region 24f includes Cu.

In the magnetic heads 121, 122, 122a, 123, and 123a as well, the increase of the damping constant can be suppressed. Thereby, for example, the first operation recited above can be performed more efficiently.

The description of the first embodiment is applicable to the configurations such as the thickness and the like of the first region 22a, the third region 23c, the fifth region 24e, the second region 22b, the fourth region 23d, and the sixth region 24f of the second embodiment.

In the first embodiment and the second embodiment, at least one of the first to third magnetic layers 25a to 25c includes, for example, Fe and Co. At least one of the first to third magnetic layers 25a to 25c may include, for example, Fe and Ni.

The magnetic heads according to the first embodiment or the second embodiment have the configuration of one of the magnetic heads recited above or the configuration of a modification of the magnetic heads recited above. As shown in FIG. 1A, the magnetic head includes, for example, the magnetic pole 30, the first shield 31, the stacked body 20 provided between the magnetic pole 30 and the first shield 31, the first terminal T1 electrically connected to the magnetic pole 30, and the second terminal T2 electrically connected to the first shield 31. The first change rate of the electrical resistance Rc of the current path 35 with respect to the fluctuation of the first current I1 when the first current I1 flows in the current path 35 between the first terminal T1 and the second terminal T2 is different from the second change rate of the electrical resistance Rc of the current path 35 with respect to the fluctuation of the second current I2 when the second current I2 flows in the current path 35. The first change rate is different from the third change rate of the electrical resistance Rc of the current path 35 with respect to the fluctuation of the third current I3 when the third current I3 flows in the current path 35. As shown in FIG. 2D, the magnitude of the first current I1 is in the first current range ir1. The magnitude of the second current I2 is in the second current range ir2 which is larger than the first current range ir1. The magnitude of the third current I3 is in the third current range ir3 which is smaller than the first current range ir1. For example, the first change rate is higher than the third change rate.

The magnetic heads according to the first embodiment or the second embodiment may have the configuration of at least one of the magnetic heads 110, 111, 112, 112a, 113, 113a, 120, 121 122, 122a, 123, or 123a or the configuration of a modification of at least one of these magnetic heads.

Third Embodiment

A third embodiment relates to a magnetic recording device. The magnetic recording device according to the embodiment includes a magnetic head, the magnetic recording medium 80 (e.g., a recording medium disk 180 described below), and the first circuit 20D (referring to FIG. 1A). Information is recorded in the magnetic recording medium by the magnetic head (the magnetic pole 30). Any magnetic head according to the first embodiment or the second embodiment and the magnetic heads of the modifications may be used as the magnetic head of the third embodiment. A case will now be described where the magnetic head 110 is used.

As described above, the first circuit 20D is configured to supply a current (the first current I1 or the second current I2) between the magnetic pole 30 and the first shield 31. The magnetic recording device according to the embodiment may further include the second circuit 30D (referring to FIG. 1A). As described above, the second circuit 30D is configured to supply, to the coil 30c, a current (the recording current Iw) corresponding to the information to be recorded in the magnetic recording medium 80.

The magnetic head 110 may perform shingled recording to the magnetic recording medium 80. The recording density can be increased further.

An example of a magnetic recording device according to the embodiment will now be described.

Figure 13:
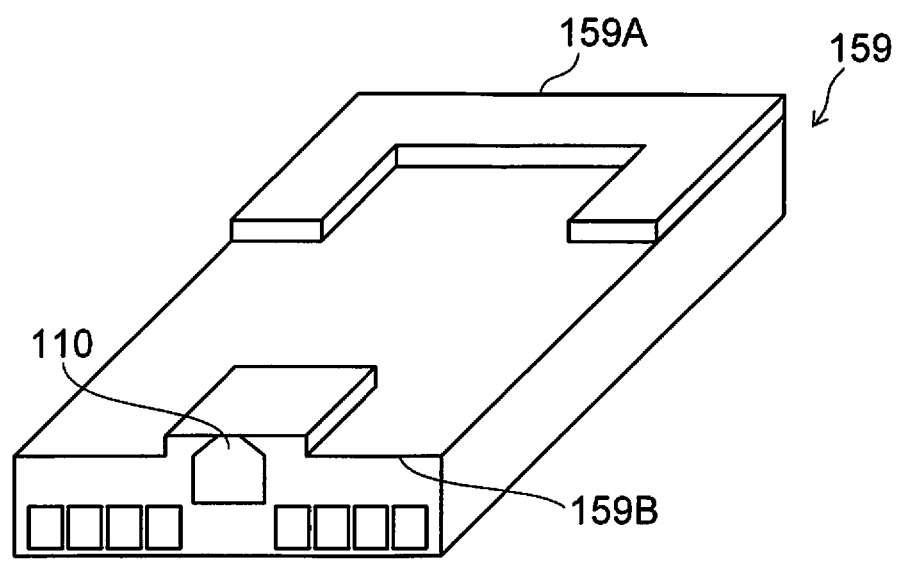
FIG. 13 is a schematic perspective view illustrating a portion of the magnetic recording device according to the embodiment.

FIG. 13 is a schematic perspective view illustrating a portion of the magnetic recording device according to the embodiment.

FIG. 13 illustrates a head slider.

The magnetic head 110 is provided in a head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 14:
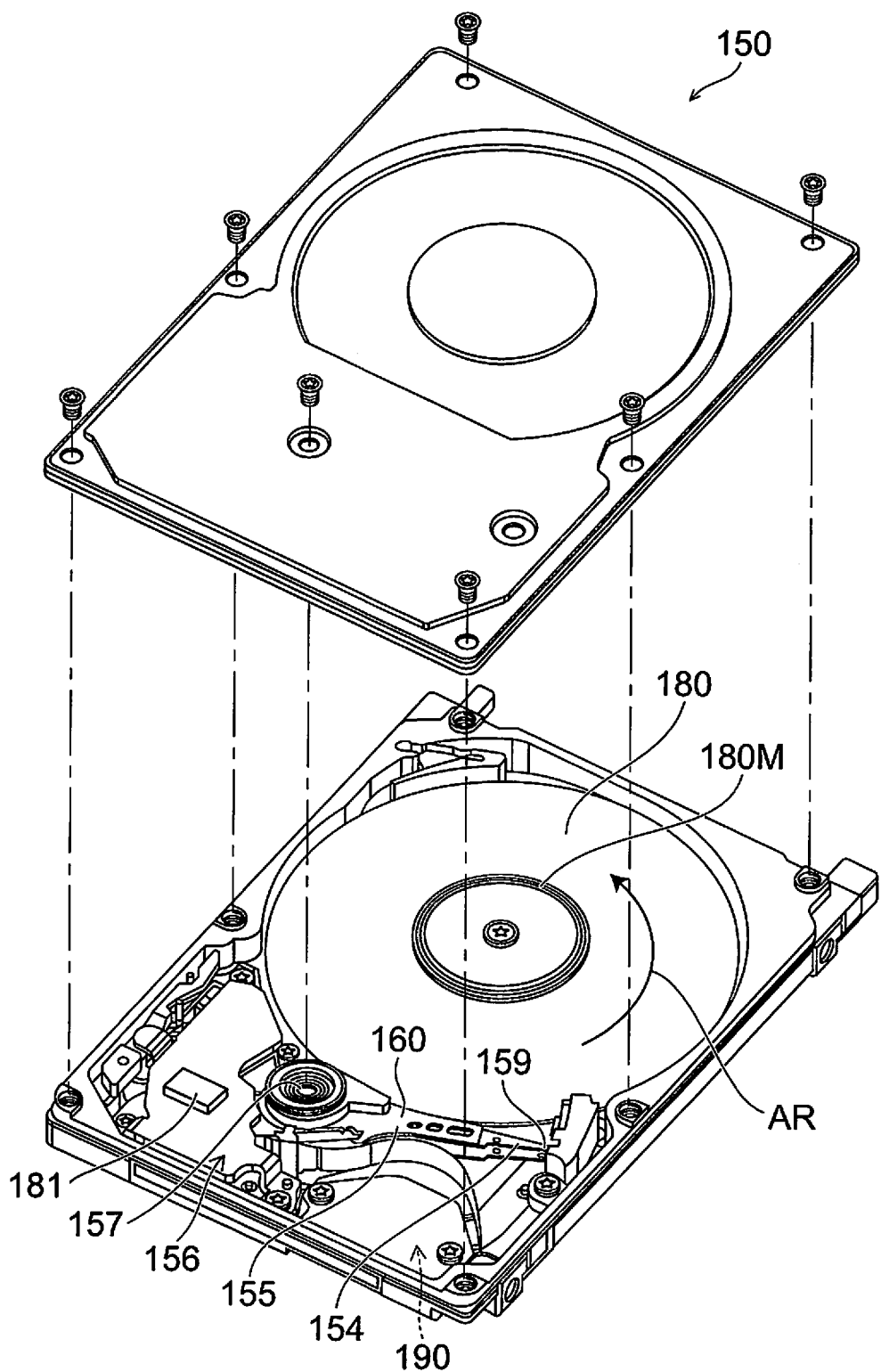
FIG. 14 is a schematic perspective view illustrating the magnetic recording device according to the embodiment.

FIG. 14 is a schematic perspective view illustrating the magnetic recording device according to the embodiment.

As shown in FIG. 14, a rotary actuator is used in the magnetic recording device 150 according to the embodiment. The recording medium disk 180 is provided in a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

Figure 15A:
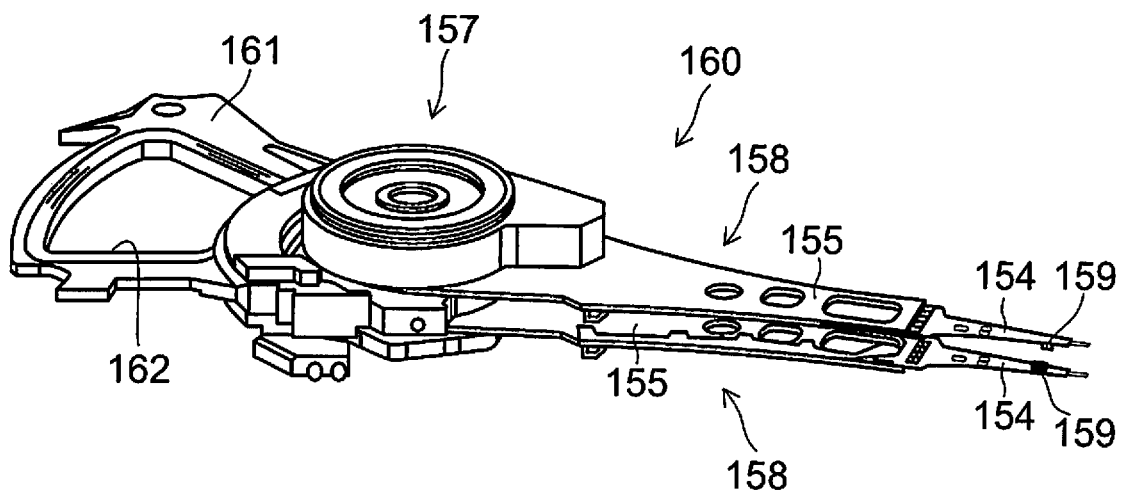
FIG. 15A and FIG. 15B are schematic perspective views illustrating a portion of the magnetic recording device according to the embodiment.
Figure 15B:
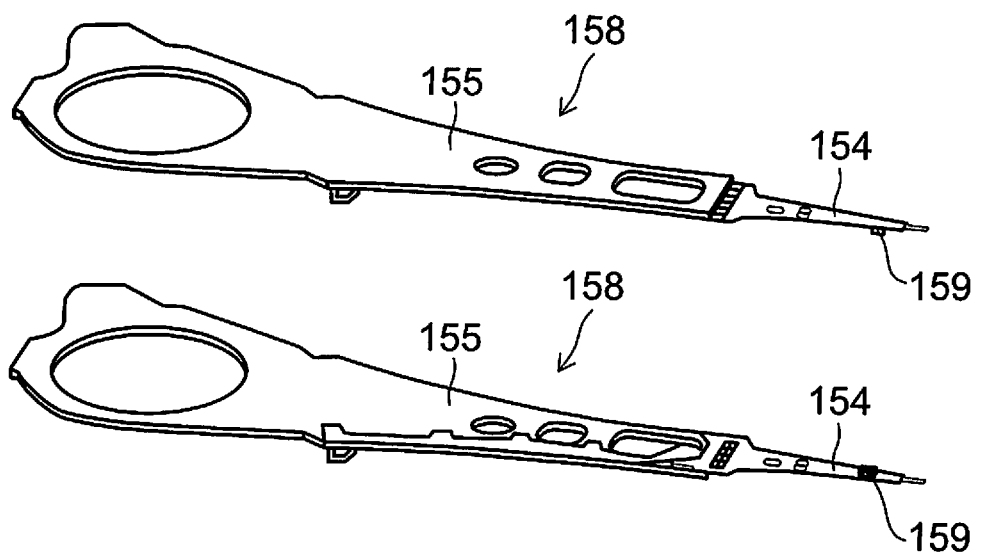

FIG. 15A and FIG. 15B are schematic perspective views illustrating a portion of the magnetic recording device according to the embodiment.

FIG. 15A illustrates the configuration of a portion of the magnetic recording device and is an enlarged perspective view of a head stack assembly 160. FIG. 15B is a perspective view illustrating a magnetic head assembly (a head gimbal assembly (HGA)) 158 that is a portion of the head stack assembly 160.

As shown in FIG. 15A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 15B, the head gimbal assembly 158 includes the arm 155 extending from the bearing part 157 and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording device 150 according to the embodiment includes a magnetic recording medium, the magnetic head assembly according to the embodiment, and a signal processor that records and reproduces the signals to and from the magnetic recording medium by using the magnetic head provided in the magnetic head assembly.

The embodiments may include the following configurations (e.g., technological proposals).

Configuration 1

A magnetic recording device, comprising:
a magnetic head including a magnetic pole, a first shield, a stacked body provided between the magnetic pole and the first shield, a first terminal electrically connected to the magnetic pole, a second terminal electrically connected to the first shield, and a coil;
a first circuit electrically connected to the first terminal and the second terminal; and
a second circuit electrically connected to the coil,
the first circuit performing at least a first operation,
in the first operation, the first circuit supplying a first current to a current path between the first terminal and the second terminal when the second circuit supplies a recording current to the coil, the first current being smaller than a second current, the second current causing an electrical resistance of the current path to oscillate.

Configuration 2

The magnetic recording device according to Configuration 1, wherein
the first circuit further performs a second operation, and in the second operation, the first circuit supplies the second current to the current path when the second circuit supplies the recording current to the coil.

Configuration 3

The magnetic recording device according to Configuration 1 or 2, wherein a frequency of the oscillation of the electrical resistance is not less than 10 GHz and not more than 50 GHz.

Configuration 4

The magnetic recording device according to any one of Configurations 1 to 3, wherein a magnitude of the first current is not less than ½ of a magnitude of the second current.

Configuration 5

The magnetic recording device according to any one of Configurations 1 to 4, wherein the electrical resistance does not oscillate in the first operation.

Configuration 6

The magnetic recording device according to any one of Configurations 1 to 5, wherein while the second circuit supplies the recording current to the coil, a first change rate of the electrical resistance with respect to a change of the first current when the first current flows in the current path is different from a third change rate of the electrical resistance with respect to a change of a third current when the third current flows in the current path, a magnitude of the third current being smaller than a magnitude of the first current.

Configuration 7

The magnetic recording device according to Configuration 6, wherein the first change rate is higher than the third change rate.

Configuration 8

The magnetic recording device according to any one of Configurations 1 to 7, further comprising a magnetic recording medium, information being recorded in the magnetic recording medium by the magnetic head,
a ratio, to the magnetic resonant frequency, of an absolute value of a difference between a frequency of the oscillation of the electrical resistance and a magnetic resonant frequency of the magnetic recording medium being 50% or less.

Configuration 9

The magnetic recording device according to any one of Configurations 1 to 8, wherein
the stacked body includes:
a first magnetic layer;
a first conductive layer provided between the first shield and the first magnetic layer, the first conductive layer including a first element including at least one selected from the group consisting of Cu, Ag, Al, Cr, and Au;
a second conductive layer provided between the magnetic pole and the first magnetic layer, the second conductive layer including a second element including at least one selected from the group consisting of Ta, Pt, W, Mo, Ir, Ru, Tb, Rh, and Pd;
a second magnetic layer provided between the first magnetic layer and the second conductive layer;
a third magnetic layer provided between the first magnetic layer and the second magnetic layer;
a third conductive layer provided between the first magnetic layer and the third magnetic layer, the third conductive layer including a third element including at least one selected from the group consisting of Ta, Pt, W, Mo, Ir, Cr, Tb, Rh, and Pd; and
a fourth conductive layer provided between the third magnetic layer and the second magnetic layer, the fourth conductive layer including a fourth element including at least one selected from the group consisting of Cu, Au, Ag, Al, Cr, Ta, Pt, W, Mo, Ir, Ru, Tb, Rh, and Pd.

Configuration 10

The magnetic recording device according to Configuration 9, wherein the first current has an orientation from the first shield toward the magnetic pole.

Configuration 11

The magnetic recording device according to Configuration 9 or 10, wherein the second current has an orientation from the first shield toward the magnetic pole.

Configuration 12

The magnetic recording device according to any one of Configurations 1 to 8, wherein
the stacked body includes:
a first magnetic layer;
a first conductive layer provided between the magnetic pole and the first magnetic layer, the first conductive layer including a first element including at least one selected from the group consisting of Cu, Ag, Al, Cr, and Au;
a second conductive layer provided between the first shield and the first magnetic layer, the second conductive layer including a second element including at least one selected from the group consisting of Ta, Pt, W, Mo, Ir, Ru, Tb, Rh, and Pd;
a second magnetic layer provided between the first magnetic layer and the second conductive layer;
a third magnetic layer provided between the first magnetic layer and the second magnetic layer;
a third conductive layer provided between the first magnetic layer and the third magnetic layer, the third conductive layer including a third element including at least one selected from the group consisting of Ta, Pt, W, Mo, Ir, Ru, Tb, Rh, and Pd; and
a fourth conductive layer provided between the third magnetic layer and the second magnetic layer, the fourth conductive layer including a fourth element including at least one selected from the group consisting of Cu, Au, Ag, Al, Cr, Ta, Pt, W, Mo, Ir, Ru, Tb, Rh, and Pd.

Configuration 13

The magnetic recording device according to Configuration 12, wherein the first current has an orientation from the magnetic pole toward the first shield.

Configuration 14

The magnetic recording device according to Configuration 12 or 13, wherein the second current has an orientation from the magnetic pole toward the first shield.

Configuration 15

The magnetic recording device according to any one of Configurations 9 to 14, wherein
the second conductive layer includes a first region and a second region,
the second region is between the first region and the second magnetic layer,
the first region includes the second element, and
the second region includes at least one selected from the group consisting of Cu, Ag, Au, Al, Ti, Cr, Mg, and V.

Configuration 16

The magnetic recording device according to any one of Configurations 9 to 14, wherein
the third conductive layer includes a third region and a fourth region,
the fourth region is between the third region and the first magnetic layer or between the third region and the third magnetic layer,
the third region includes the third element, and
the fourth region includes at least one selected from the group consisting of Cu, Ag, Au, Al, Ti, Cr, Mg, and V.

Configuration 17

The magnetic recording device according to any one of Configurations 9 to 16, wherein
the fourth conductive layer includes a fifth region and a sixth region,
the sixth region is between the fifth region and the second magnetic layer or between the fifth region and the third magnetic layer,
the fifth region includes at least one selected from the group consisting of Ta, Pt, W, Mo, Ir, Ru, Tb, Rh, and Pd, and
the sixth region includes at least one selected from the group consisting of Cu, Ag, Au, Al, Ti, Cr, Mg, and V.

Configuration 18

A magnetic head, comprising a magnetic pole, a first shield, a stacked body provided between the magnetic pole and the first shield, a first terminal electrically connected to the magnetic pole, and a second terminal electrically connected to the first shield,
the stacked body including
a first magnetic layer,
a first conductive layer provided between the first shield and the first magnetic layer, the first conductive layer including a first element including at least one selected from the group consisting of Cu, Ag, Al, Cr, and Au,
a second conductive layer provided between the magnetic pole and the first magnetic layer, the second conductive layer including a second element including at least one selected from the group consisting of Ta, Pt, W, Mo, Ir, Ru, Tb, Rh, and Pd,
a second magnetic layer provided between the first magnetic layer and the second conductive layer,
a third magnetic layer provided between the first magnetic layer and the second magnetic layer,
a third conductive layer provided between the first magnetic layer and the third magnetic layer, the third conductive layer including a third element including at least one selected from the group consisting of Ta, Pt, W, Mo, Ir, Ru, Tb, Rh, and Pd, and
a fourth conductive layer provided between the third magnetic layer and the second magnetic layer, the fourth conductive layer including a fourth element including at least one selected from the group consisting of Cu, Au, Ag, Al, Cr, Ta, Pt, W, Mo, Ir, Ru, Tb, Rh, and Pd.

Configuration 19

A magnetic head, comprising a magnetic pole, a first shield, a stacked body provided between the magnetic pole and the first shield, a first terminal electrically connected to the magnetic pole, and a second terminal electrically connected to the first shield,
the stacked body including
a first magnetic layer,
a first conductive layer provided between the magnetic pole and the first magnetic layer, the first conductive layer including a first element including at least one selected from the group consisting of Cu, Ag, Al, Cr, and Au,
a second conductive layer provided between the first shield and the first magnetic layer, the second conductive layer including a second element including at least one selected from the group consisting of Ta, Pt, W, Mo, Ir, Cr, Tb, Rh, and Pd, a second magnetic layer provided between the first magnetic layer and the second conductive layer, a third magnetic layer provided between the first magnetic layer and the second magnetic layer, a third conductive layer provided between the first magnetic layer and the third magnetic layer, the third conductive layer including a third element including at least one selected from the group consisting of Ta, Pt, W, Mo, Ir, Cr, Tb, Rh, and Pd, and a fourth conductive layer provided between the third magnetic layer and the second magnetic layer, the fourth conductive layer including a fourth element including at least one selected from the group consisting of Cu, Au, Ag, Al, Cr, Ta, Pt, W, Mo, Ir, Ru, Tb, Rh, and Pd.

Configuration 20

The magnetic head according to Configuration 18 or 19, wherein a thickness of the third magnetic layer along a first direction from the second conductive layer toward the first conductive layer is thinner than a thickness of the first magnetic layer along the first direction and thinner than a thickness of the second magnetic layer along the first direction.

Configuration 21

A magnetic head, comprising a magnetic pole, a first shield, a stacked body provided between the magnetic pole and the first shield, a first terminal electrically connected to the magnetic pole, and a second terminal electrically connected to the first shield, a first change rate of an electrical resistance of a current path with respect to a fluctuation of a first current when the first current flows in the current path being different from a second change rate of the electrical resistance of the current path with respect to a fluctuation of a second current when the second current flows in the current path, the current path being between the first terminal and the second terminal, the first change rate being different from a third change rate of the electrical resistance of the current path to a fluctuation of a third current when the third current flows in the current path, a magnitude of the first current being in a first current range, a magnitude of the second current being in a second current range larger than the first current range, a magnitude of the third current being in a third current range smaller than the first current range.

Configuration 22

The magnetic head according to Configuration 21, wherein the first change rate is higher than the third change rate.

According to the embodiments, a magnetic recording device and a magnetic head can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, magnetic layers, conductive layers, insulating layers, wires, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices, and magnetic heads practicable by an appropriate design modification by one skilled in the art based on the magnetic recording devices, and the magnetic heads described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
    a magnetic head including a magnetic pole, a first shield, a stacked body provided between the magnetic pole and the first shield, a first terminal electrically connected to the magnetic pole, a second terminal electrically connected to the first shield, and a coil;
    a first circuit electrically connected to the first terminal and the second terminal; and
    a second circuit electrically connected to the coil,
    the first circuit configured to switch between a first operation and a second operation,
    in the first operation, the first circuit being configured to supply a first current to a current path between the first terminal and the second terminal when the second circuit supplies a recording current to the coil, the first current being smaller than a second current, the second current causing an oscillation of an electrical resistance of the current path, the first current not causing an oscillation of the electrical resistance of the current path,
    in the second operation, the first circuit being configured to supply the second current to the current path when the second circuit supplies the recording current to the coil.

2. The device according to claim 1, wherein a frequency of the oscillation of the electrical resistance is not less than 10 GHz and not more than 50 GHz.

3. The device according to claim 1, wherein a magnitude of the first current is not less than ½ of a magnitude of the second current.

4. The device according to claim 1, wherein while the second circuit supplies the recording current to the coil, a first change rate of the electrical resistance with respect to a change of the first current when the first current flows in the current path is different from a third change rate of the electrical resistance with respect to a change of a third current when the third current flows in the current path, a magnitude of the third current being smaller than a magnitude of the first current.

5. The device according to claim 4, wherein the first change rate is higher than the third change rate.

6. The device according to claim 1, further comprising a magnetic recording medium, information being recorded in the magnetic recording medium by the magnetic head, a ratio, to the magnetic resonant frequency, of an absolute value of a difference between a frequency of the oscillation of the electrical resistance and a magnetic resonant frequency of the magnetic recording medium being 50% or less.

7. The device according to claim 1, wherein the stacked body includes:
   a first magnetic layer;
   a first conductive layer provided between the first shield and the first magnetic layer, the first conductive layer including a first element including at least one selected from the group consisting of Cu, Ag, Al, Cr, and Au;
   a second conductive layer provided between the magnetic pole and the first magnetic layer, the second conductive layer including a second element including at least one selected from the group consisting of Ta, Pt, W, Mo, Ir, Ru, Tb, Rh, and Pd;
   a second magnetic layer provided between the first magnetic layer and the second conductive layer;
   a third magnetic layer provided between the first magnetic layer and the second magnetic layer;
   a third conductive layer provided between the first magnetic layer and the third magnetic layer, the third conductive layer including a third element including at least one selected from the group consisting of Ta, Pt, W, Mo, Ir, Cr, Tb, Rh, and Pd; and
   a fourth conductive layer provided between the third magnetic layer and the second magnetic layer, the fourth conductive layer including a fourth element including at least one selected from the group consisting of Cu, Au, Ag, Al, Cr, Ta, Pt, W, Mo, Ir, Ru, Tb, Rh, and Pd.

8. The device according to claim 7, wherein the first current has an orientation from the first shield toward the magnetic pole.

9. The device according to claim 7, wherein the second current has an orientation from the first shield toward the magnetic pole.

10. The device according to claim 7, wherein the second conductive layer includes a first region and a second region,
    the second region is between the first region and the second magnetic layer,
    the first region includes the second element, and
    the second region includes at least one selected from the group consisting of Cu, Ag, Au, Al, Ti, Cr, Mg, and V.

11. The device according to claim 7, wherein the third conductive layer includes a third region and a fourth region,
    the fourth region is between the third region and the first magnetic layer or between the third region and the third magnetic layer,
    the third region includes the third element, and
    the fourth region includes at least one selected from the group consisting of Cu, Ag, Au, Al, Ti, Cr, Mg, and V.

12. The device according to claim 7, wherein the fourth conductive layer includes a fifth region and a sixth region,
    the sixth region is between the fifth region and the second magnetic layer or between the fifth region and the third magnetic layer,
    the fifth region includes at least one selected from the group consisting of Ta, Pt, W, Mo, Ir, Ru, Tb, Rh, and Pd, and
    the sixth region includes at least one selected from the group consisting of Cu, Ag, Au, Al, Ti, Cr, Mg, and V.

13. The device according to claim 1, wherein the stacked body includes:
    a first magnetic layer;
    a first conductive layer provided between the magnetic pole and the first magnetic layer, the first conductive layer including a first element including at least one selected from the group consisting of Cu, Ag, Al, Cr, and Au;
    a second conductive layer provided between the first shield and the first magnetic layer, the second conductive layer including a second element including at least one selected from the group consisting of Ta, Pt, W, Mo, Ir, Ru, Tb, Rh, and Pd;
    a second magnetic layer provided between the first magnetic layer and the second conductive layer;
    a third magnetic layer provided between the first magnetic layer and the second magnetic layer;
    a third conductive layer provided between the first magnetic layer and the third magnetic layer, the third conductive layer including a third element including at least one selected from the group consisting of Ta, Pt, W, Mo, Ir, Ru, Tb, Rh, and Pd; and
    a fourth conductive layer provided between the third magnetic layer and the second magnetic layer, the fourth conductive layer including a fourth element including at least one selected from the group consisting of Cu, Au, Ag, Al, Cr, Ta, Pt, W, Mo, Ir, Ru, Tb, Rh, and Pd.

14. The device according to claim 13, wherein the first current has an orientation from the magnetic pole toward the first shield.

15. The device according to claim 13, wherein the second current has an orientation from the magnetic pole toward the first shield.

* * * * *